United States Patent [19]

Hamada et al.

[11] Patent Number: 4,967,224
[45] Date of Patent: Oct. 30, 1990

[54] AUTOMATIC FOCUSING DEVICE

[75] Inventors: Masataka Hamada, Osaka; Tokuji Ishida, Daito, both of Japan

[73] Assignee: Minolta Camera Kabushiki Kaisha, Osaka, Japan

[21] Appl. No.: 308,412

[22] Filed: Feb. 9, 1989

Related U.S. Application Data

[60] Division of Ser. No. 83,819, Aug. 10, 1987, Pat. No. 4,860,045, which is a continuation of Ser. No. 936,103, Nov. 28, 1986, abandoned.

[30] Foreign Application Priority Data

Nov. 27, 1985 [JP] Japan ............................ 60-268015
Dec. 13, 1985 [JP] Japan ............................ 60-280788
Dec. 13, 1985 [JP] Japan ............................ 60-280789

[51] Int. Cl.$^5$ .................... G03B 13/36; G02B 7/28
[52] U.S. Cl. ............................ 354/402; 250/201.2
[58] Field of Search .................. 354/402–409, 354/430; 352/140; 358/227; 250/201, 201 PF, 201 AF, 204, 201.2, 201.4, 201.6, 201.7, 201.8

[56] References Cited

U.S. PATENT DOCUMENTS

| | | | |
|---|---|---|---|
| 4,218,119 | 8/1980 | Schickedanz | 354/432 X |
| 4,387,975 | 6/1983 | Araki | 354/407 X |
| 4,434,362 | 2/1984 | Wilwerding | 354/402 X |
| 4,445,761 | 5/1984 | Ishikawa et al. | 354/402 |
| 4,492,448 | 1/1985 | Ishikawa et al. | 354/406 |
| 4,503,325 | 3/1985 | Araki | 354/402 X |
| 4,506,150 | 3/1985 | Ogasawara | 354/402 X |
| 4,647,979 | 3/1987 | Urata | 354/430 X |

FOREIGN PATENT DOCUMENTS 60-214325 10/1985 Japan.

Primary Examiner—W. B. Perkey
Attorney, Agent, or Firm—Price, Gess & Ubell

[57] ABSTRACT

An automatic focusing device for a camera is disclosed.

The automatic focusing device has focus detection means for detecting defocus amount of the image, object movement detection means for detecting movement of the object based on defocus data detected by the focus detection means and correction means for correcting the detected defocus amount according to the detected movement of the object.

The objective lens of the camera is driven according to the corrected defocus amount for focus adjustment.

9 Claims, 18 Drawing Sheets

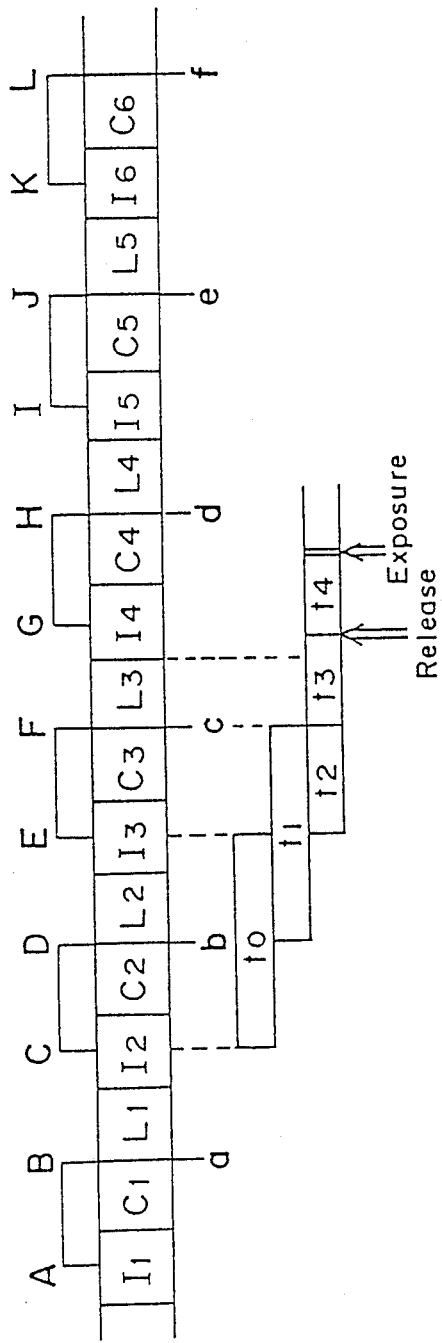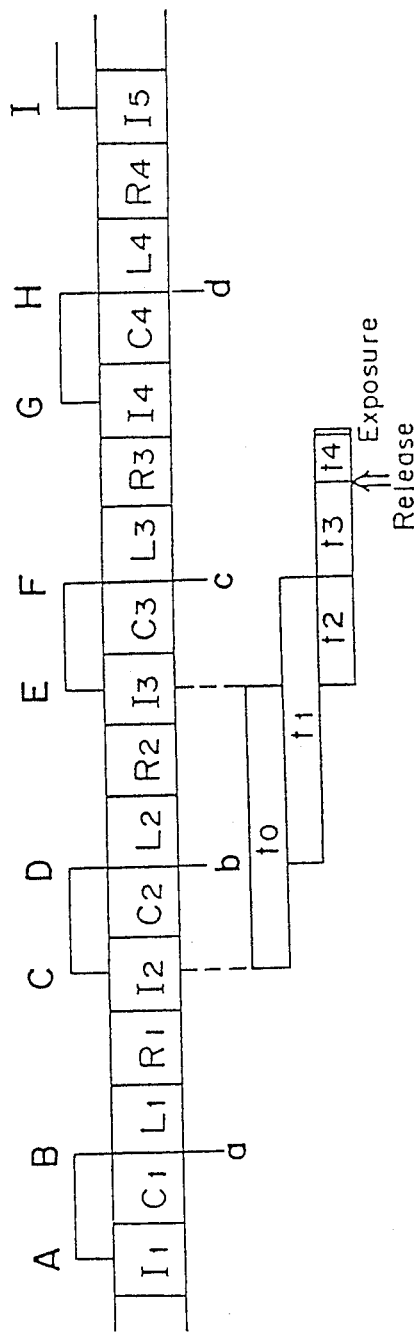
Fig. 6
Fig. 7

AUTOMATIC FOCUSING DEVICE

This is a division of application Ser. No. 083,819, filed Aug. 10, 1987, now U.S. Pat. No. 4,860,045 which is a continuation of abandoned U.S. Ser. No. 936,103, filed Nov. 28, 1986.

BACKGROUND OF THE INVENTION

1. Field of the Invention

The present invention relates to an automatic focusing device for a camera which is able to detect a focusing condition of an objective lens of a camera by receiving light beams of an object image having passed through the object lens and to drive the objective lens to a focus position thereof automatically according to data obtained by said detection.

2. Description of the Prior Art

There has been known a focus condition detecting device in which two images are formed by refocusing light bundles of an object image having passed through a first and second areas of an objective lens being symmetric with respect to the optical axis of the objective lens, a relative distance between these two images is calculated and a defocus amount of the focus position detected from a predetermined focus position and a direction of the defocus are determined based on the relative distance calculated.

A typical optical system for such a focus condition detecting device as mentioned above is shown in FIG. 17.

In this system, a condenser lens 6 is arranged on a predetermined focal plane 4 or on a plane positioned behind the focal plane and two refocusing lenses 8 and 10 are arranged rearward of the condenser lens 6. There are arranged two image sensors 12 and 14 on each of focal planes of two refocusing lens. Each of the image sensors 12 and 14 is comprised of a CCD (change coupled device) image sensor having a plurality of light sensing elements.

As shown in FIG. 17 schematically, when an image (A) of an object is focused forward of the predetermined focal plane 4, two images a and a' are refocused on the image sensors 12 and 14 so as to approach to each other with respect to the optical axis 18 of the objective lens. On the contrary to the above, when focused rearward of the predetermined focal plane 4, two images b, b' are refocused apart from each other. If an image is focused just on the predetermined focal plane 4, a distance between two points corresponding to one to one of two images refocused on two image sensors 12 and 14 becomes a specific value which is determined by the composition of the optical system of the focus condition detecting device. Accordingly, a focus condition of the objective lens can be determined from the distance between corresponding two points of the refocused images.

In an automatic focusing device of a camera including the focus condition detecting device as mentioned above, a control circuit including at least one micro computer controls the integration of light by the CCD image sensors to have the CCD image sensors generate image signals corresponding to the intensity distributions of the object images formed on the CCD image sensors by the refocusing lenses, respectively. Thereafter, the control circuit controls calculation of the focus condition (the amount of defocus) based on the image signals from the CCD image sensors, driving the objective lens according to the amount of defocus calculated, stopping the objective lens at a focus position thereof and a shutter release (when the shutter release button is pushed) sequentially according to control programs stored in the micro computer. The automatic focusing device repeats the automatic focus adjusting control towards a focus position successively and due to repeated controls, the objective lens is attained to an exact focus position finally.

Meanwhile, in the automatic focusing device as mentioned above, if an object is moving toward or going away from the camera, an exact focus position can not be attained by moving the objective lens to a focus position according to a defocus amount obtained by one focus condition detecting operation since the object is moving during said operation. FIG. 18 shows a behavior of the automatic focusing device diagrammatically when an object is moving relative to the camera.

In the graph of FIG. 18, horizontal axis represents time and the vertical axis represents an amount of defocus on a film surface.

A continuous curve 1 shows a variation of a defocus amount being taken with respect to the film surface in the case that an object is moving toward the camera and no focus adjustment is carried out. A noncontinuously bent line m is a line obtained by plotting defocus amounts caused when the automatic focusing operation is repeated.

The time $t_0$ indicates a middle timing during first integration by each of the CCD image sensors. A defocus amount at that time is defined as $D_0$. During the time from $t_0$ to $t_1$, a remaining integration and calculation for obtaining a defocus amount are executed. During the time from $t_1$ to $t_2$, the objective lens is driven and then, the objective lens is stopped and the next integration is started during the time from $t_2$ to $t_3$. Further, the next calculation is executed during the time from $t_3$ to $t_4$.

As shown in FIG. 18, while the defocus amount increases to the position A due to the movement of the object, the objective lens is driven to move the object image only to a position 0. Therefore, a defocus with an amount represented by a difference $(D_0-D_1)$ results. Next integration is done to obtain a defocus amount $(D_2-D_1)$ (at the timing $t_3$). and driving of the objective lens is completed at the timing $t_5$. However, an image of object by objective lens has been already moved to a position B, and, therefore, a defocus amount $(D_3-D_2)$ is caused. This focus amount $(D_3-D_2)$ is enlarged when compared with the preceding defocus amount $(D_2-D_1)$.

Similarly to the above, the defocus amount increases as indicated at the positions C $(D_5-D_4)$ and D $(D_7-D_6)$ respectively, though the automatic focusing operation is repeatedly carried out. Thus it becomes impossible to attain an exact focus position. Such a delay in the automatic focusing controls as is caused by a moving object becomes more serious in the case that an interchangeable lens having a long focal length such as a telescopic lens is on the camera body mounted.

SUMMARY OF THE INVENTION

An object of the present invention is to provide an automatic focusing device being able to minimize a defocus amount by appropriate correction of a defocus amount detected by focus detection even when the object is moving rapidly relative to the camera.

To this end, according to the present invention, there is provided an automatic focusing device for a camera having a focus adjustable objective lens for forming an image of an object, comprising:

focus detection means for repeatedly detecting defocus amount of the image formed by the objective lens from a predetermined focal plane of the objective lens to generate a defocus signal corresponding to the detected defocus amount upon each detecting operation:

object movement detection means for detecting movement of the object based on the defocus signals generated upon the latest detecting operation and a former detecting operation of the focus detection means to generate a movement signal corresponding to the amount of movement of the object;

drive means for driving the objective lens for focus adjustment:

correction means for generating a corrected defocus signal based on the defocus signal generated upon the latest detecting operation by the focus detection means and the movement signal regarding to the object: and drive control means for causing the drive means to drive the objective lens in accordance with the corrected defocus signal, the corrected defocus signal corresponded to a defocus amount of the image from the predetermined focal plane at a given moment after the latest detecting operation by the focus detection means.

With the above construction, the amount of defocus at a given moment after the latest detecting operation of the focus detecting means can be estimated based on the movement signal which is taken in for generation of the corrected defocus signal. Thus, the lens drive control based on the corrected defocus signal assures automatic focusing of the objective lens with respect to the object at the given moment, so that the automatic focusing in pursuit of the movement of the object is achieved.

The above and other objects and features of the present invention will become more apparent from the following description of preferred embodiments of the present invention taken in conjunction with the accompanying drawings.

BRIEF DESCRIPTION OF DRAWINGS

FIGS. 6 and 7 are time charts showing automatic focusing operations in the single picture-taking mode and continuous picture-taking mode, respectively.

DESCRIPTION OF PREFERRED EMBODIMENTS

[I] Composition of system for Automatic Focusing Device.

Figure 14:
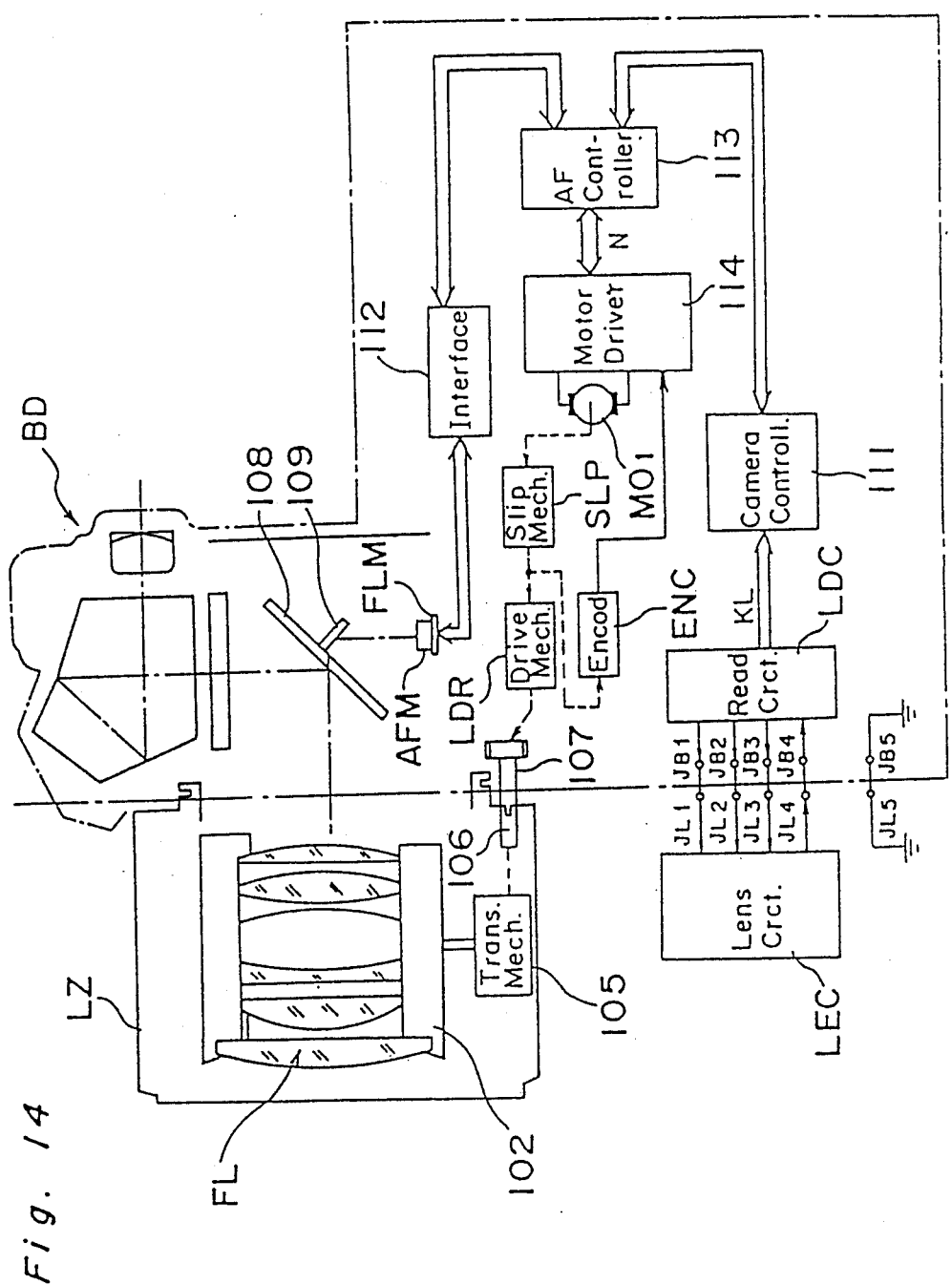
FIG. 14 is a block - diagram of a camera in which the automatic focusing device according to the present invention is installed.

FIG. 14 shows a system for an automatic focusing device of a camera.

As shown in FIG. 14, the camera is comprised of a camera body (BD) and an interchangeable lens (LZ). The interchangeable lens(LZ) is mounted to the camera body (BD) and is connected thereto via clutch means (106), (107) mechanically.

When the interchangeable lens (LZ) is mounted on the camera body (BD), a circuit for lens data provided therein is electrically connected to a circuit in the camera body via joint terminals (JL1) to (JL5) and (JB1) to (JB5). In this system, a light image of an object having been passed through the objective lens(LZ) passes through a central half - mirror portion provided on a reflex mirror (108) so as to be reflected by a sub - mirror 109 and, then is received by a CCD image sensor (FLM) housed in a focus detecting module (AFM). An interface circuit (112) is provided for driving the CCD image sensor (FLM) for reading data obtained by the CCD image sensor and for transmitting said data to an automatic focusing controller (113). The auto - focusing controller (113) calculates an amount of defocus $|\Delta L|$ which is defined as a shift amount of an image of an object from a focus position and a direction of defocus which is defined as the direction of the shift of the object image from the focus position.

A motor driving circuit (114) is provided to drive a motor (M01) for moving a focusing lens (FL) of the interchangeable lens (LZ) according to data outputted from the auto - focusing controller. The driving force of the motor (M01) is transmitted to a transmission mechanism (105) of the interchangeable lens via a slipping mechanism (SLP), driving mechanism (LDR) and the clutch means (107) and (106). The slipping mechanism (SLP) is provided for protecting the motor (M01) by slipping when a torque larger then a predetermined value is loaded thereon.

The transmission mechanism (105) drives the focusing optical system (FL) in the direction of the optical axis in order for focusing. An encoder (ENC) for monitoring a driving amount of the motor (M01) is connected to the driving mechanism (LDR) in the camera body. The number of pulses outputted by the encoder (ENC) is proportional to a driving amount of the motor (M01) for driving the focusing lens of the interchangeable lens. Assuming that the number of rotations of the motor (M01) is "NH", the number of pulses from the encoder (ENC) is "N", the resolution of the encoder is "$\rho(1/\text{rot.})$", a deceleration ratio of the transmission mechanism including mechanical elements from the drive shaft of the motor to the support shaft for the encoder is "$\mu P$", a deceleration ratio of the transmission mechanism including mechanical elements from the drive shaft of the motor (M01) to the clutch means (107) of the camera body side is "$\mu B$", a deceleration ratio of the transmission mechanism including mechanical elements from the clutch means (106) of the lens side to the lens assembly of the interchangeable lens is "$\mu L$", a lead of a helicoid of a focus adjusting member (102) is "LH (mm/rot)" and a moving amount of the focusing lens (FL) is "$\Delta d$(mm)", there are given equations as follows.

$$N = \rho \cdot \mu P \cdot NM$$

$$\Delta d = NM \cdot \mu B \cdot \mu L \cdot LH$$

Namely, $$\Delta d = NM \cdot \mu B \cdot \mu L \cdot LH / (\rho \cdot \mu P) \ldots \quad (1)$$

Further, the ratio of $\Delta d$ to a shift amount $\Delta L$(mm) of a focal plane caused by the movement ($\Delta d$) of the focusing lens (FL) is defined as follows.

$$Kop = \Delta d / \Delta L \ldots \quad (2)$$

From equations (1) and (2), there is obtained an equation as follows.

$$N = Kop \cdot \Delta L \cdot \rho \cdot \mu P / (\mu B \cdot \mu L \cdot LH) \ldots \quad (3)$$

Assuming following equations, $$KL = Kop / (\mu L \cdot LH) \ldots \quad (4)$$

$$KB = \rho \cdot \mu P / \mu B \ldots \quad (5)$$

there is introduced an equation as follows.

$$N = KB \cdot KL \cdot \Delta L \ldots \quad (6)$$

In the equation (6), $\Delta L$ is obtained from the defocus amount $|\Delta L|$ and the direction thereof.

The date KB in the equation (5) is a constant determined according to the deceleration ratio $\mu B$ of the camera body side and is stored in a control circuit (111) in the camera body.

Connections between the reading circuit (LDC) and the lens data circuit (LEC) are as follows. From the reading circuit (LDC) to the lens data circuit (LEC), electric power is supplied via connecting terminals (JB1) and (JL1), synchronizing clock pulses are applied via connecting terminals (JB2) and (JL2) and a starting signal for reading lens data is applied via connecting terminals (JB3) and (JPL3). From the lens data circuit (LEC) to the reading circuit (LDC), lens data KL are outputted via connecting terminals (JB4) and (JL4) serially. Remaining connecting terminals (JB5) and (JL5) are used as common ground terminals.

The lens data circuit (LEC), when the starting signal is entered thereinto via terminals (JB3) and (JL3), outputs data KL to the reading circuit (LDC) serially in a manner synchronized with clock pulses being applied via terminals (JB2) and (JL2). The reading circuit (LDC) reads serial data KL in a manner synchronized with same clock pulses as mentioned above and convert serical data to parallel data. The camera controller (111) calculates ($KL \cdot KB = K$) according to data KL from the lens data circuit (LEC) and data KB stored therein. The auto-focusing controller (113) calculates a defocus amount $|\Delta L|$ with use of data about an object image sent from the inter-face circuit (112) and the number N of pulses to be detected by the encoder (ENC) according to the equation $N = K \cdot |\Delta L|$ with use of the defocus amount $|\Delta L|$ calculated and data K sent from the camera controller (111). The auto-focusing circuit (113) drives the motor (M01) through the motor driving circuit (114) in a direction determined according to the direction of defocus having been sought with use of data of an object image. When pulses have been outputted from the encoder (ENC) by a number equal to the number N having been calculated by the auto-focusing controller (113), the motor (M01) is stopped since it is considered that the focusing lens of the interchangeable lens has been moved to a focus position by the amount $\Delta d$ having been sought.

Although the value of K was sought from the data KB stored in the camera body and the data KL stored in the interchangeable lens in the embodiment just mentioned above, the calculating method is not limited thereto.

For instance, in the case that a common interchangeable lens can be mounted to anyone of camera bodies having a specific value of KB respectively, the lens data circuit (LEC) housed in the interchangeable lens (LZ) is so designed as to output data K1 ($K1 = KL \cdot KB1$) determined by the specific value KB of the specific camera bodies but varying with the set focal length of the interchangeable lens. Meanwhile, on the side of the specific camera body, the calculation of KL·KB is omitted and, inplace of that, data K1 are entered into the auto focusing controller (113) from the reading circuit (LDC). In the case that another camera body having a value KB2 being different from the KB1 value is used, the camera controller (111) is so designed as to store data of KB2/KB1 and to obtain a value of K2 ($K2 = KL \cdot KB2$) by calculating following equation.

$$K2 = K1 \cdot KB2 / KB1 = KL \cdot KB2$$

Especially in the case of zoom lenses in which a focusing lens assembly is arranged forward of a zooming lens assembly, a value of KL or K of individual zoom lenses varies in a very wide range since a value of Kop is given by a following equation.

$$Kop = (fl/f)^2 \ldots \quad (7)$$

Wherein fl is the focal length of the focusing lens assembly and f is the focal length of the zooming lens. In such a case as mentioned above, data KL or K to be memorized in the lens data circuit (LEC) is divided into data representing the exponent thereof and data representing significant digit thereof (for instance, if data is comprised of eight bits, top four bits are used for representing the exponent and bottom four bits are used for representing the significant digit). In this case, the reading circuit (LDC) in the camera body reads data of the exponent and data of the significant digit respectively and outputs data KL or K to the camera controller (111) after converting to a normal figure due to the exponent and the significant degit having been read therein. According to such a format as mentioned above, it becomes possible to treat with data KL or K even in the case that it varies in a very wide range. It is to be noted that almost all functions regarding to the auto - focusing system are carried out by at least one micro - computer although the system is shown as a block diagram in FIG. 14 in order to be able to understand these functions and operations more easily.

Figure 15:
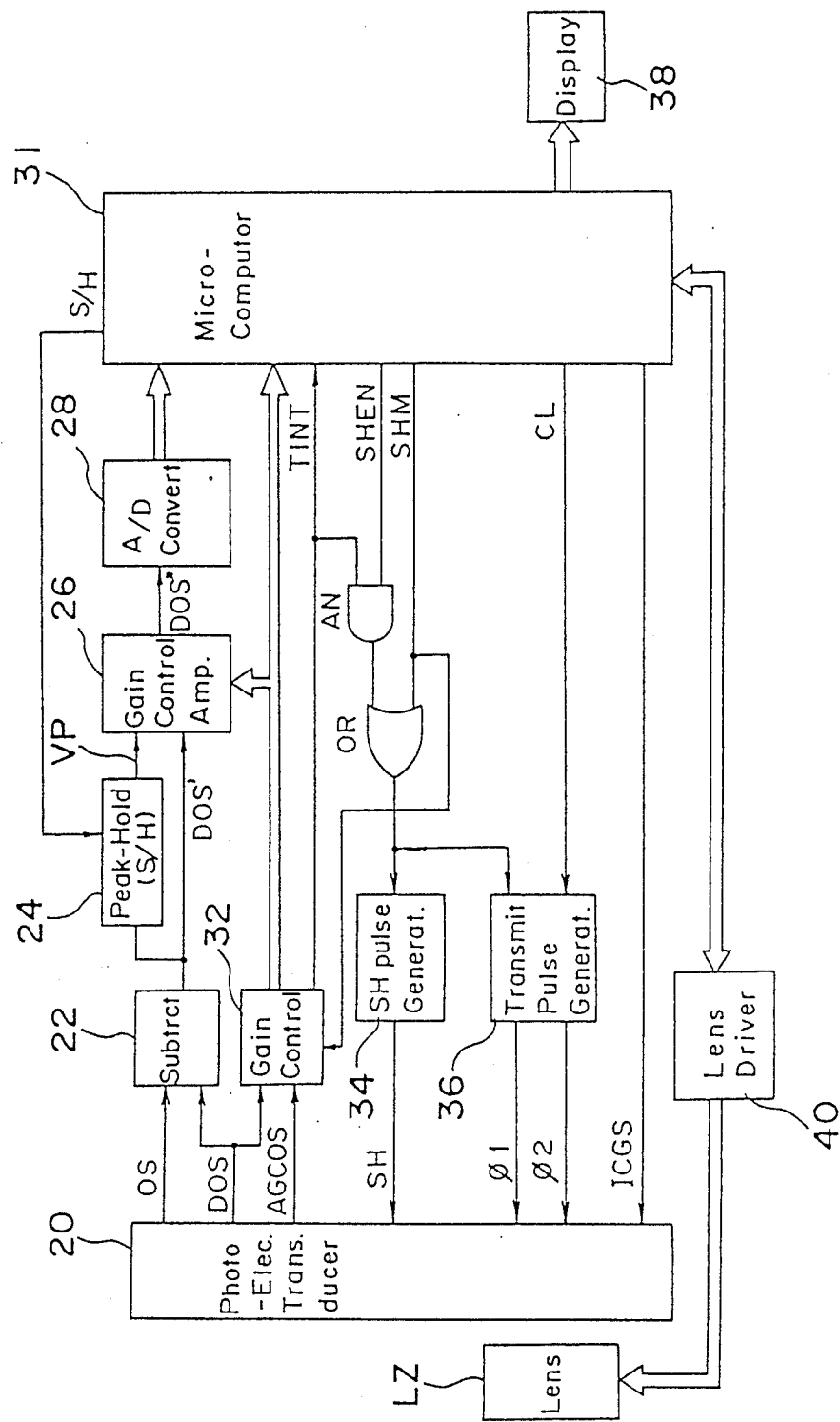
FIG. 15 is a block - diagram of an automatic focusing control circuit according to the present invention.
Figure 16:
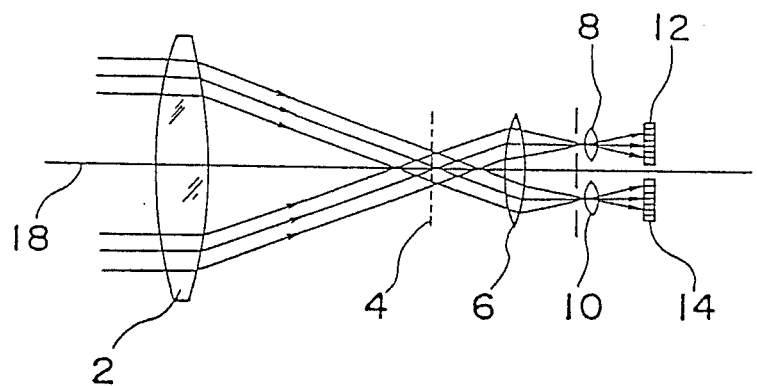
FIG. 16 is an explanative view for showing compositions of an optical system for a focus - condition detecting device.
Figure 17:
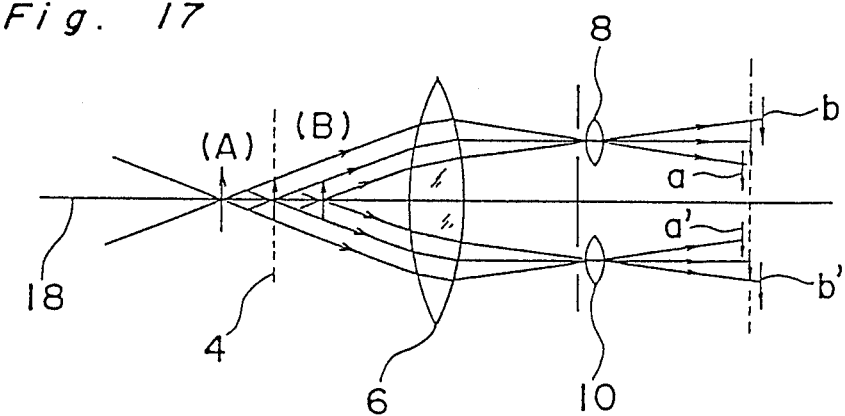
FIG. 17 is an explanative view for showing the principle of focus condition detection.
Figure 18:
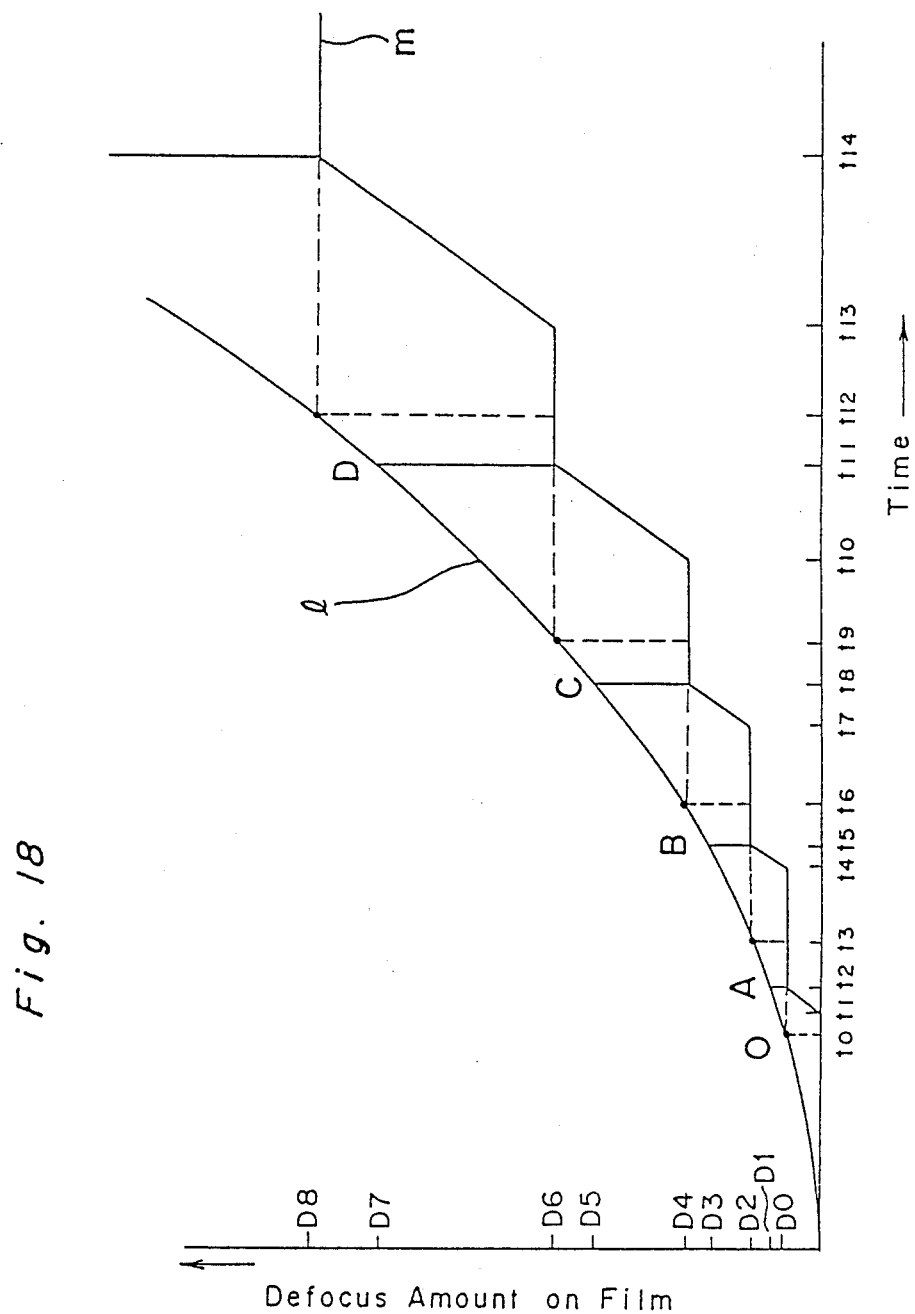
FIG. 18 is a graph showing delay in the conventional automatic focusing device caused by a moving object.

FIG. 15 shows a block diagram of a focus condition detecting control circuit. A control circuit (31) constituted by a micro - computer starts a focus condition detecting operation when a shutter release button (not shown) is pushed down by a half stroke thereof while a switch for the focus condition detecting mode is turned ON.

At first, an integration clear pulse signal is outputted from the control circuit 31 to a CCD image sensor provided in a photo - electric transducer circuit (20) acting as a first and second arrays of micro photo-electric transforming elements. Due to this signal, all of elements of the CCD image sensor are reset to initial states and an output AGCOS of an illumination monitoring circuit (not shown) housed in the CCD image sensor is set up to the level of the voltage of the power source. At the same time, the control circuit (31) outputs a permission signal SHEN of "High" level for permitting to generate a shift pulse. As soon as the integration clear signal ICGS disappears, integration of photocurrent is started in every element of the CCD image sensor. At the same time, while the output AGCOS of the illumination monitoring circuit in the photo-electric transducer circuit begins to drop with a velocity corresponding to the illumination of an object, a reference signal DOS generated by a reference signal generating circuit (not shown) provided in the photo - electric transducer circuit (20) is kept to a constant reference level. A gain control circuit (32) compares the output AGCOS with the reference signal DOS and controls a gain of a differential amplifier (26) of a gain variable type according to an amount of drop of the output AGCOS relative to the reference level DOS within a predetermined time interval (for instance, it is set to 100 m sec upon the focus condition detecting operation). The gain control circuit (32) outputs a signal TINT of "High" level as soon as it detects that AGCOS signal have dropped to a level equal to or lower than a predetermined level against the reference level DOS within the predetermined time interval starting from the disappearance of the integration clear signal ICGS. The signal TINT is input to a shift pulse generating circuit (34) via a AND gate (AN) and an OR gate (OR) and the shift pulse generating circuit (34) outputs a shift pulse SH in response thereto. When the shift pulse SH is input to the photo - electric transducer (20), the integration operation of photo - current by each light sensing element of the CCD image sensor is stopped and, then, charges accumulated in each light sensing element and corresponding to integrated values of the photo - current are transmitted parallel to cells in a shift register provided in the CCD image sensor so as to correspond one to one to the light sensing elements of the CCD image sensor.

Further, a transmission pulse generating circuit (36) outputs two sensor driving pulses Φ1 and Φ2 having phases different from each other by 180° in a manner synchronized with clock pulses from the control circuit (31). The CCD image sensor in the photo - electric transducer circuit (20) outputs signals OS forming image signals respectively by discharging a charge of each cell of the CCD shift register serially in the order of alignment of elements. This OS signal has a higher voltage as an intensity of incident light to a corresponding element is weaker. A subtraction circuit (22) subtracts OS signal from DOS signal and outputs the difference (DOS - OS) as a picture element signal.

On the contrary to the above, if the predetermined time interval has elapsed been passed without outputting TINT signal after the disappearance of ICGS signal, the control circuit (31) outputs an instruction signal SHN for generating a shift pulse of "High" level. Therefore, in this case, the shift pulse generating circuit (34) generates a shift pulse in response to this instruction signal SHM.

Further, the control circuit (31) outputs a sample - hold signal S/H when element signals from seventh to tenth element are outputted. This area of the CCD image sensor corresponding to these elements is covered with an aluminum mask, so that these elements integrate only dark currents inherent to the CCD image sensor. Namely, these picture elements are shuted from the incident light. A peak hold circuit (24), when the sample hold signal S/H is applied thereto, holds a difference between the reference signal DOS and one of output signals from the seventh to tenth elements covered with the aluminum mask. Thereafter, the difference VP and element signal DOS' are input to the gain variable amplifier (26). That gain variable amplifier (26) amplifies a difference (VP-DOS') between VP and DOS' with a gain controlled by the gain control circuit (32). The amplified signal DOS" is converted from analogue data to digital data by an A/D converter (28) and digital data are applied to the control circuit (31) as picture element signal data. Though the A/D conversion by the A/D converter is done in a unit of 8 bits, data are transmitted to the control circuit in each lump of top four bits and bottom four bits.

The control circuit (31) stores these picture element signal data in an internal memory thereof and, when all of element signal data have been stored therein, processes those data according to programs set therein to calculate a defocus amount and a direction of defocus, to display these data on a display (38) and to drive a lens driving device (40) according to the defocus amount and the direction thereof in order for auto - focusing adjustment of the interchangeable lens.

[II] Automatic Focusing Method

<II-1> flow for Automatic Focusing

Figure 1A:
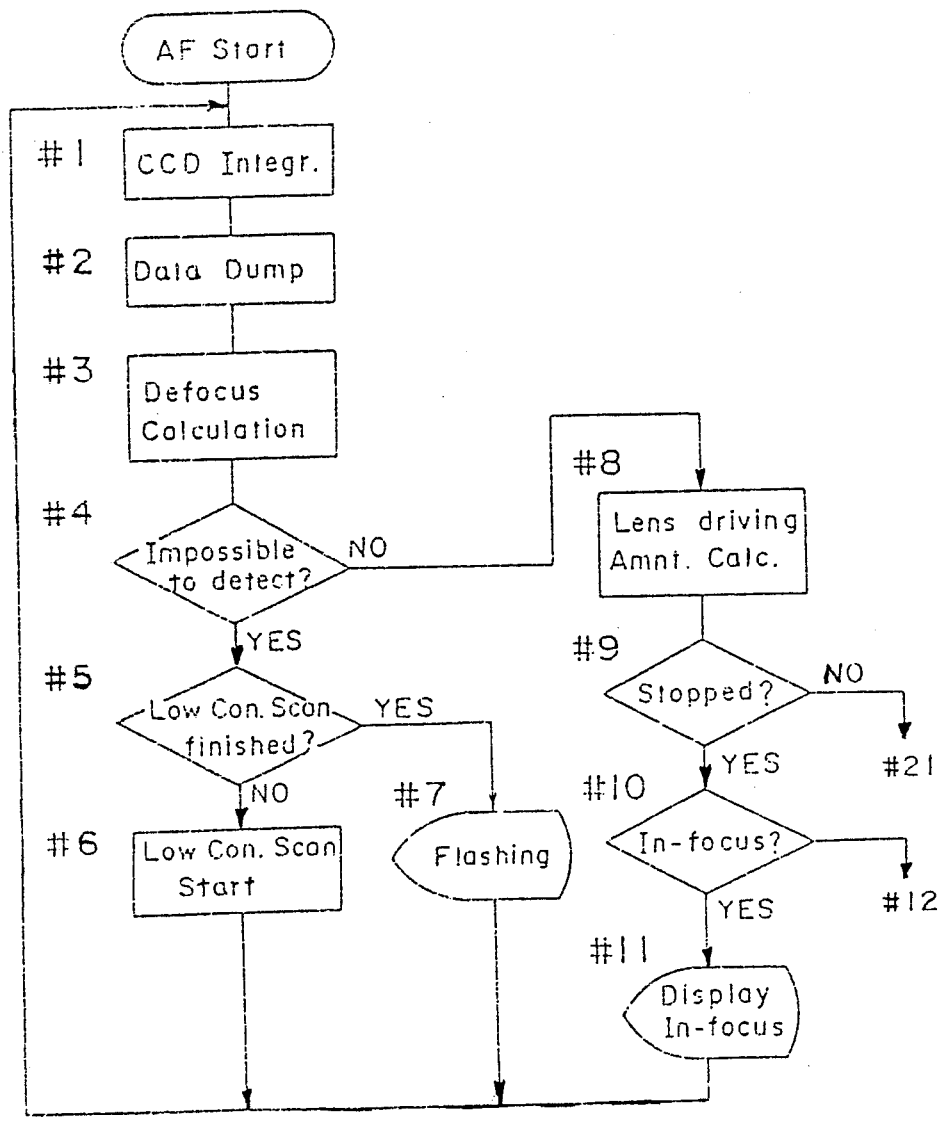
FIGS. 1(a) and 1(b) show a flow chart of a main routine program for automatic focusing control according to the present invention.
Figure 1B:
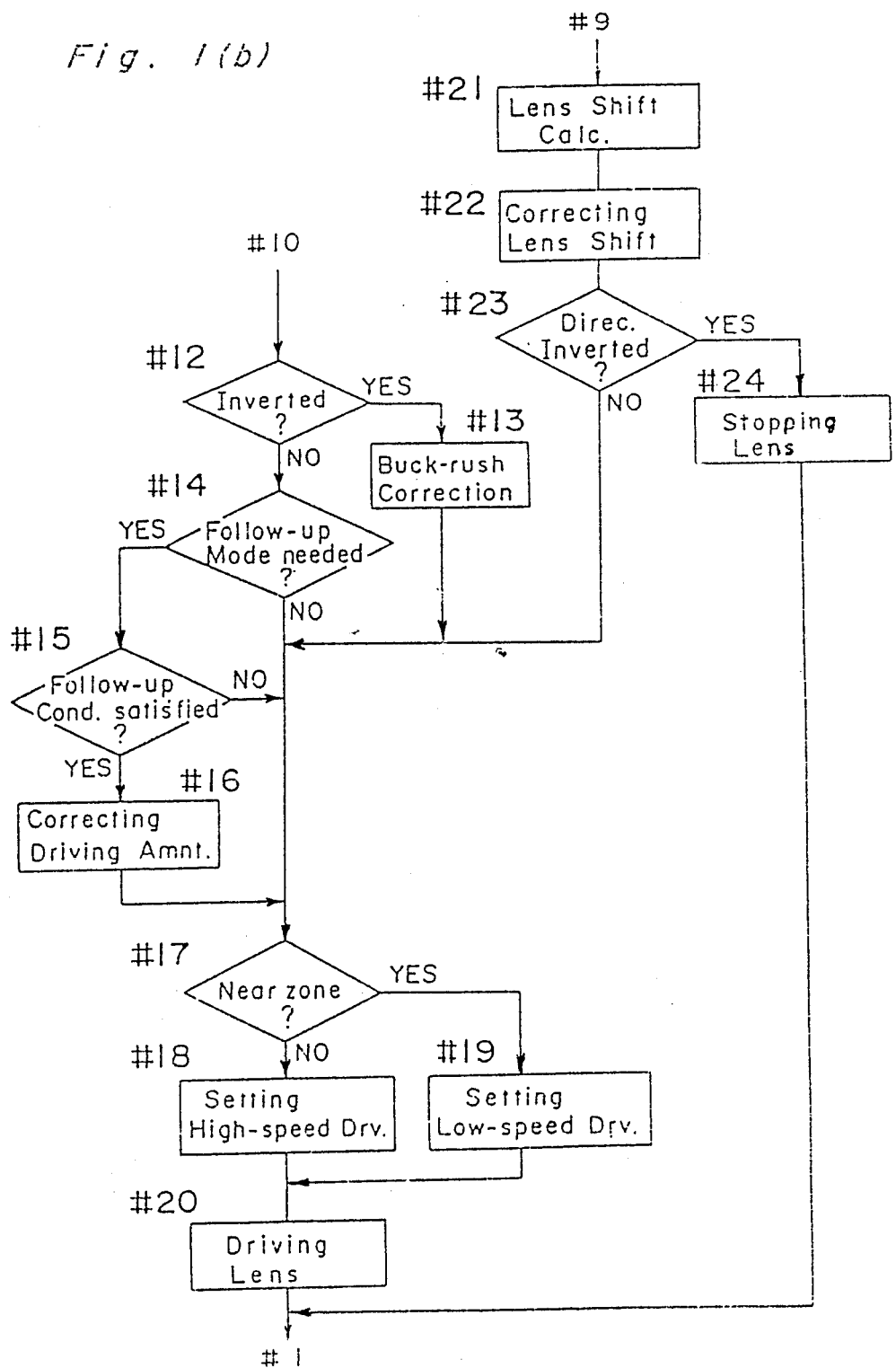

FIGS. 1(a) and 1(b) show a flow chart of a main routine program for automatic focusing.

When the main routine is started, CCD image sensor is driven to integrate photo currents by it's light sensing elements and stores data regarding an object image at step #1. At step #2, the control circuit (31) reads picture element data from CCD image sensor while converting them to digital data. At step #3, a defocus amount is calculated according to picture element data obtained. An example of calculation method will be stated below.

At step #4, it is decided whether a focus condition can be detected or not. If an image of an object is out of focus too much to detect a focus condition or contrast of an object image is too low to ensure the focus detection, the process proceeds to step #5. Steps from #5 to #7 are provided for processing in the case of low contrast. In this case, the focusing lens of the interchangeable lens is driven to scan the whole range thereof in order to seek for a range having a relatively high contrast by repeating detections of focus condition (this processing is referred to "low-contrast scan". If any range showing a high contrast has not been found during the low contrast scan, the process proceeds to step #7 to indicate that the focus condition detection is impossible by flushing the display.

If it is decided at step #4 that the focus condition detection is possible a driving amount for the interchangeable lens is calculated at step #8 from the defocus amount obtained at step #3. It is decided at step #9 whether the lens has been stopped or not. If the lens has been stopped, the process proceeds to step #10 to decide whether the lens is in focus or out of focus. If it is in focus, the process proceeds to step #11 to indicate that it is in focus and then, is returned to step #1. If it is out of focus, the process proceeds to step #12 in order to decide whether the direction of defocus at the present time is inverted from that of the last time or not. If it is inverted, the process proceeds to step #13 in order to remove possible back-rushes of the driving mechanism which might cause errors upon driving the lens in the inverted direction.

If not inverted, the process proceeds to step #14 to decide whether a follow-up correction which will be stated below in detail is needed or not. At step #15, it is decided whether condition and/or timing for the follow up correction to be done are satisfied or not. If conditions are satisfied, the driving amount of the lens is corrected or adjusted. The correction of the driving amount will be stated below in connection with the follow-up correction mode.

If the lens is moving, the process proceeds from step #9 to #21 to calculate an amount of movement overshoot of the lens from the dumping of image data until a completion of the focus condition detecting calculation (See, for instance Japanese patent laid open publication No. 78823/1981), At step #22, the driving amount of the lens is corrected due to the amount of movement of the lens calculated.

Although the driving amount is corrected by the movement of the lens at step #22, it is also possible to correct the driving amount by not only the movement of the lens but also data regarding to a movement of an object. At step #23, the direction of driving lens obtained at the present time is compared with that obtained at the last time. If it is decided that the direction is inverted, the process proceeds to step #24 in order to stop the lens and then, returned to step #1. A reason why the lens is made stopped is that credibility in a focus condition detection would be lowered when it were done during movement of the lens. If a driving direction of the lens is not inverted, the process proceeds to the step #17. At step #17, it is decided whether the defocus amount having been calculated is near to zero or not, that is, whether the focusing lens is in a near focus zone with a given width or not. If it is near to zero, the process proceeds to step #19 to set a predetermined low speed for driving the lens. If it is not near to zero, the process proceeds to step #18 to set a predetermined high speed for driving the lens. At step #20, a driving operation of the lens is started. If the lens has been already started to drive, the driving is continued. Then, the process is returned to step #1 to repeat the next calculation of a defocus amount.

<II-2> Calculation of Defocus Amount

Figure 2A:
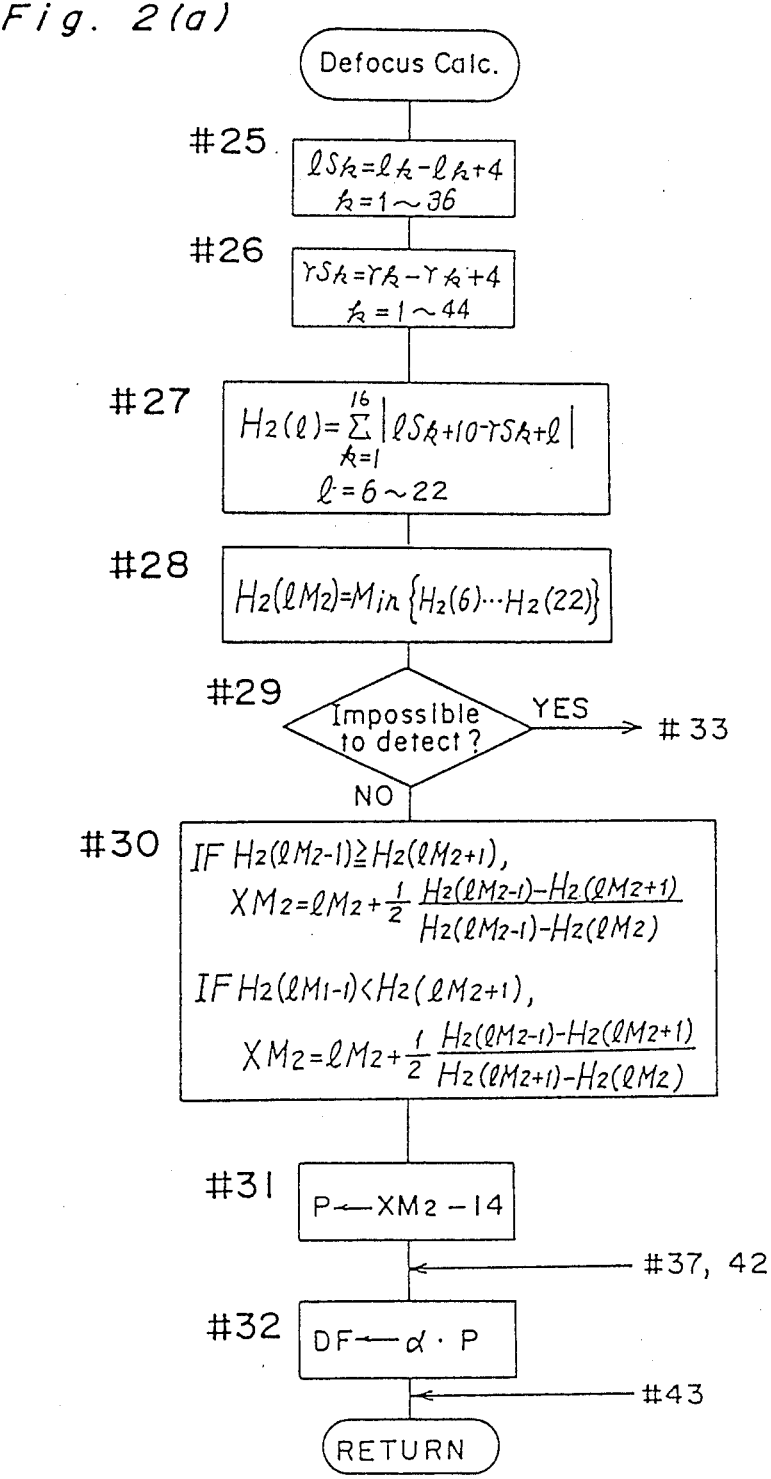
FIGS. 2(a) and 2(b) are a flow chart for showing contents of step #1 in the flow chart shown in FIG. 1(a)
Figure 2B:
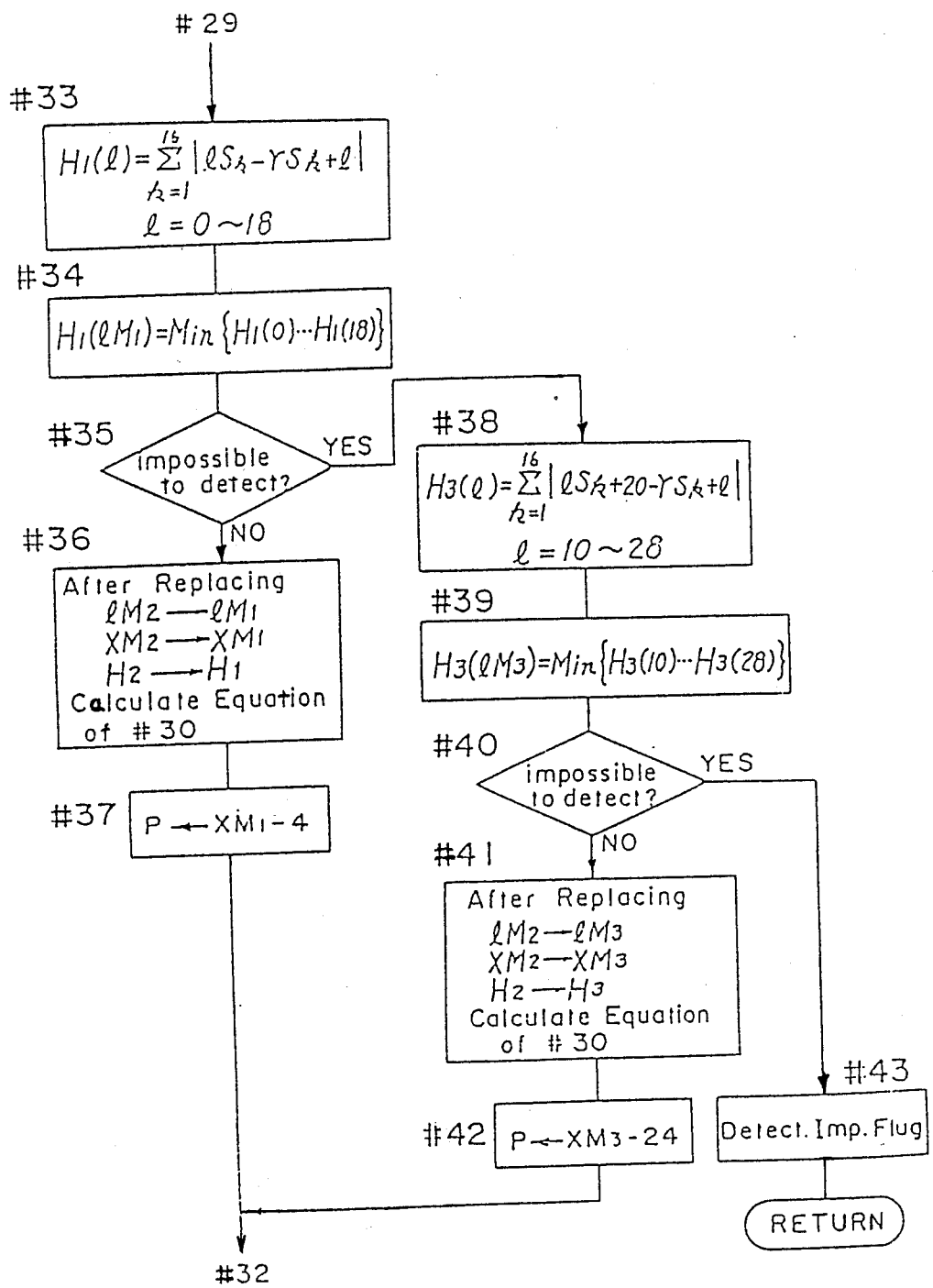

FIG. 2 shows contents of the calculation of a defocus amount to be done at step #3 of FIG. 1.

Since the principle of the calculation of a defocus amount is disclosed precisely in Japanese patent laid open publication No. 126517/1985 or No. 4914/1986., concrete processings thereabout will be stated hereinafter.

Before starting the explanation of the flow chart, a composition of the CCD image sensor will be stated in order for better understanding thereabout.

Figure 3:
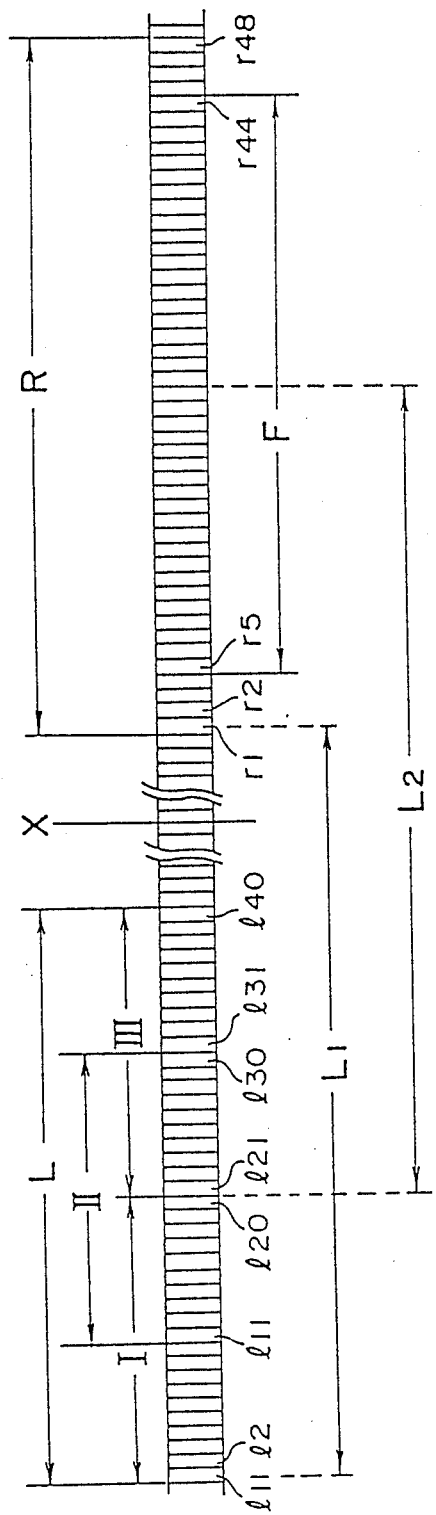
FIG. 3 is an explanative plan view showing a CCD image sensor used in an automatic focusing device according to the present invention.

As shown in FIG. 3, the CCD image sensor has a lot of light sensing elements aligned linearly and the central portion thereof is formed as a separating zone. On one side of the separating zone, a standard portion L is defined so as to have forty picture elements from $l_1$ to $l_{40}$ and a reference portion R is defined so as to have forty eight picture elements from $r_1$ to $r_{48}$ on the other side.

In the standard portion L, there are defined first to third blocks I to III being overlapped with each other. These first to third blocks I to III comprise picture elements from $l_1$ to $l_{20}$, from $l_{11}$ to $l_{30}$ and from $l_{21}$ to $l_{40}$, respectively. A calculation for calculating correlation degrees is executed at first with use of the second block II. If any effective minimum value is not found out by the correlation calculation with respect to the second block, a next correlation calculation is executed in the order of the first and third blocks. As shown in Table and FIG. 4, each shift amount of the outputs of the picture elements belonging to each block of the standard portion (L) with respect to those of the picture elements belonging to the reference portion (R) is obtained so as to overlap partically with each other.

TABLE

| | | Area of Pic Element | Diff. Data | Left Most Elem. for Corr. Calc. | Dect. Area for Image Dist. Error (Max) |
|---|---|---|---|---|---|
| Stand. Port. (L) | First Block (I) | $l_1 \sim l_{20}$ | $ls_1 \sim ls_{16}$ | $r_5$ ($rs5$) | $-4 \sim 14$ pitch |
| | Second Block (II) | $l_{11} \sim l_{30}$ | $ls_{11} \sim ls_{26}$ | $r_{15}$ ($rs15$) | $-8 \sim 8$ pitch |
| | Third Block (III) | $l_{21} \sim l_{40}$ | $ls_{21} \sim ls_{36}$ | $r_{25}$ ($rs25$) | $-14 \sim 4$ pitch |
| Ref. Port. (R) | All | $r_1 \sim r_{48}$ | $rs_1 \sim rs_{44}$ | | |

Next, a calculation method of defocus amount will be descripted according to the flow chart shown in FIG. 2.

At steps #25 and #26, a preliminary processing about object image data is done. As shown in blocks of steps #25 and #26, picture element differential data $lSk$ and $rSk$ are made by subtracting every fourth picture element data, respectively ($lSk = lk - lk+4$; wherein k is one of integers from 1 to 36, $rSk = rk - rk+4$; wherein k is one of integers from 1 to 44). This data-processing is done for the purpose of filter effect of a kind due to a low-pass filter and is effective to remove possible errors in the focus condition detection which might be caused by an unbalance between two images which is induced due to manufacturing errors in the optical system for detecting a focus condition.

Figure 4:
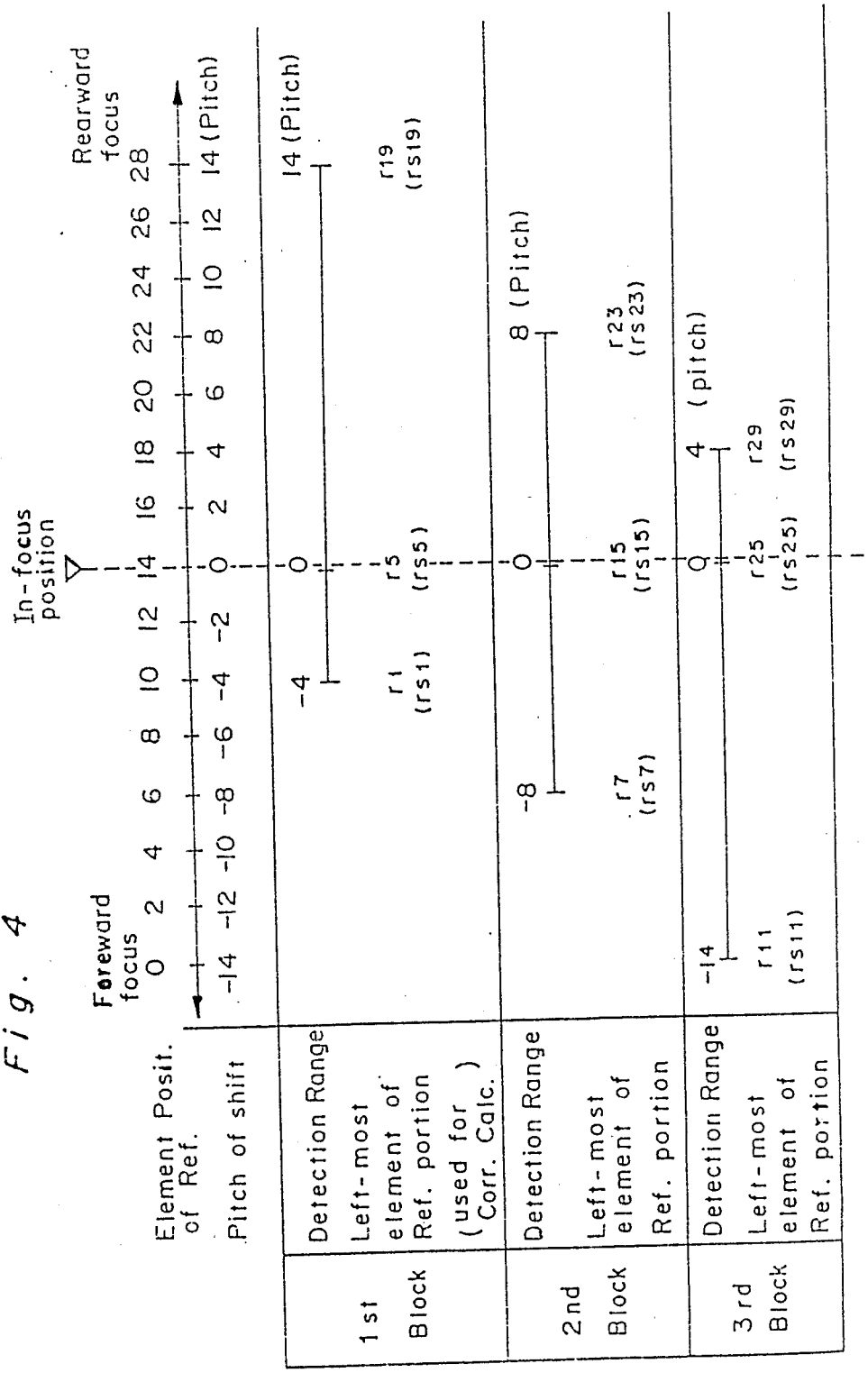
FIG. 4 is a table for showing the composition of the CCD image sensor.

At step #27, a first correlation calculation between the standard portion L and the reference portion R is executed with use of the second block II of the standard portion. The range in which a defocus amount from the focus position can be sought due to the first correlation calculation is a range defined between ($-8$)th pitch and ($+8$)th pitch of picture element when the focus position as a null position, defined as shown in FIG. 4. In other words, the range is a range defined between the sixth picture element and the twenty second picture element of the reference portion R (rSk+1; 1=6–22).

At step #28, minimum correlation function $H_2(lM_2)$ which shows the highest correlation is sought among correlation functions from $H_2(6)$ to $H_2(22)$. It is decided at step #29 whether the correlation calculation having been done has an credibility enough for calculating a defocus amount therefrom. If decided "YES" at step #29, the process proceeds to step #30 to execute such an interpolation calculation as shown in the block of step #30. According to this interpolation calculation, the maximum correlation position $XM_2$ is sought. At step #31, a shift amount P from the regular focus position is sought with use of the maximum correlation position $XM_2$ having been sought with a high precision and a defocus amount DF is calculated from the shift amount P sought at step #32.

If it is decided at step #28 that the correlation calculation having been done not have credibility, the process proceeds to step #33 in order to execute a second correlation calculation with use of the first block I. The range of the first block I is defined from ($-4$)th pitch to ($+14$)th pitch, namely from zeroth position to 18th position in the reference portion (See. FIG. 4). Similarly to the correlation calculation with use of the second block I, a maximum correlation position $lM_1$ is sought at step #34 and, at step #35, it is decided whether the reliability or credibility of the second correlation calculation is enough for calculating a defocus amount or not.

When decided "YES", the process proceeds to step #36 to execute an interpolation calculation similarly to that of step #30. However, it is to be noted that $lM_2$, $XM_2$ and $H_2$ contained in the equations of step #30 are replaced to $lM_1$, x $M_1$, and $H_1$, respectively. Then, a shift amount P from the regular focus position is sought from the maximum correlation position and a defocus amount DF is calculated at step #32.

When decided "NO" at step #35, the process proceeds to step #38 to execute a third correlation calculation with use of the third block III. The range of third block III is defined from ($-14$)th pitch to ($+4$)th pitch, namely from 10th position to 28th position in the reference portion R, as shown in FIG. 4. Similarly to the correlation calculation with use of the first and second blocks I and II, a maximum correlation position $XM_3$, a shift amount P and a defocus amount DF are sought from step #38 to #42, respectively.

If it is decided that the correlation calculation with use of the third block III has not reliability or credibility sufficient for calculation a defocus amount, the process proceeds to step #43 in order to set a flag indicating the impossibility of the focus detecting calculation at step #43 and, then, returns to step #3 of FIG. 1. This flag is read at step #4 of the main routine of FIG. 1. If the flag has been set, the low contrast scan is started at step #5.

<11-3> Follow-up Mode

Figure 5A:
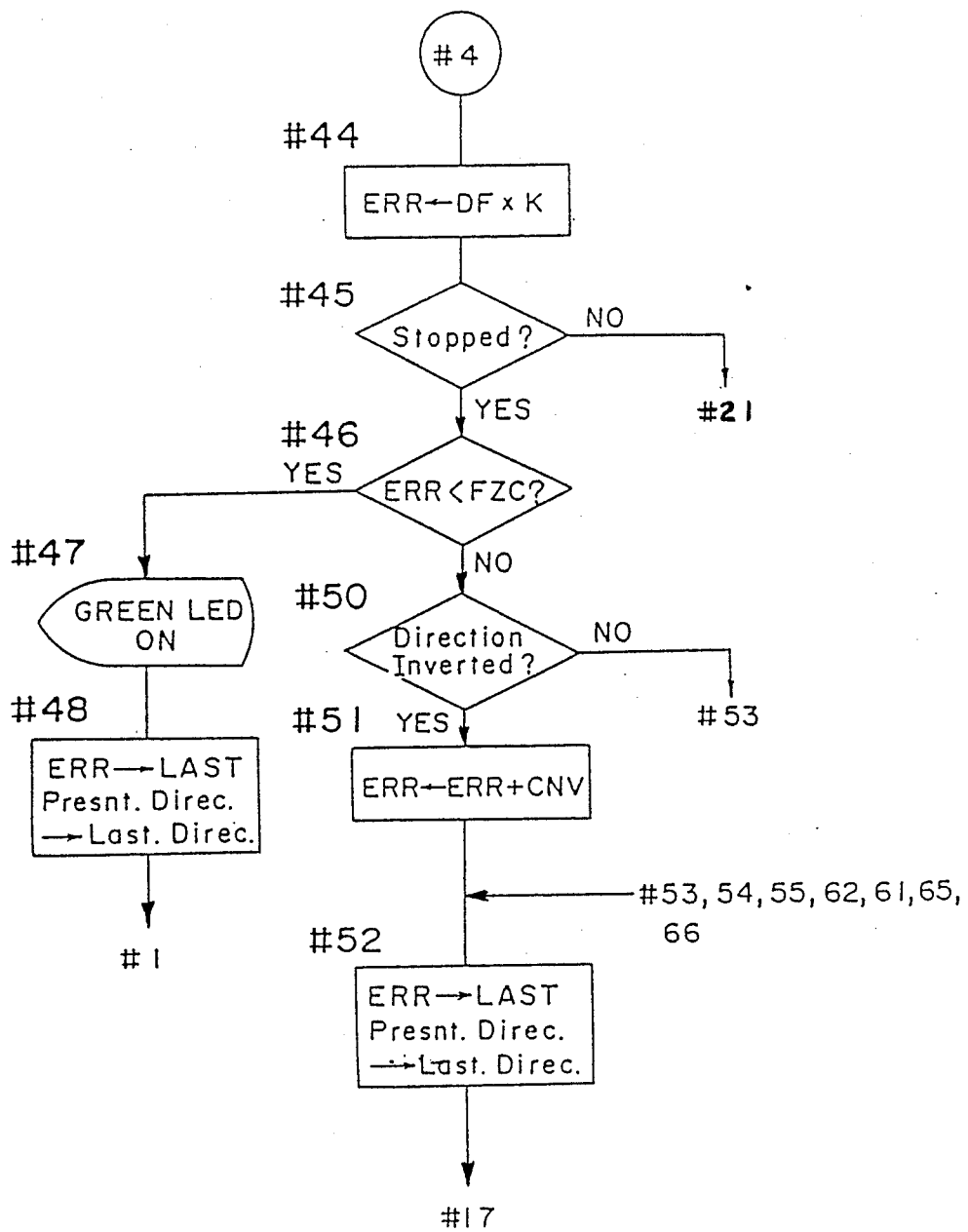
FIGS. 5(a) and 5(b) are a flow chart showing contents of steps #8 to #17 of FIG. 1(b) concretely.
Figure 5B:
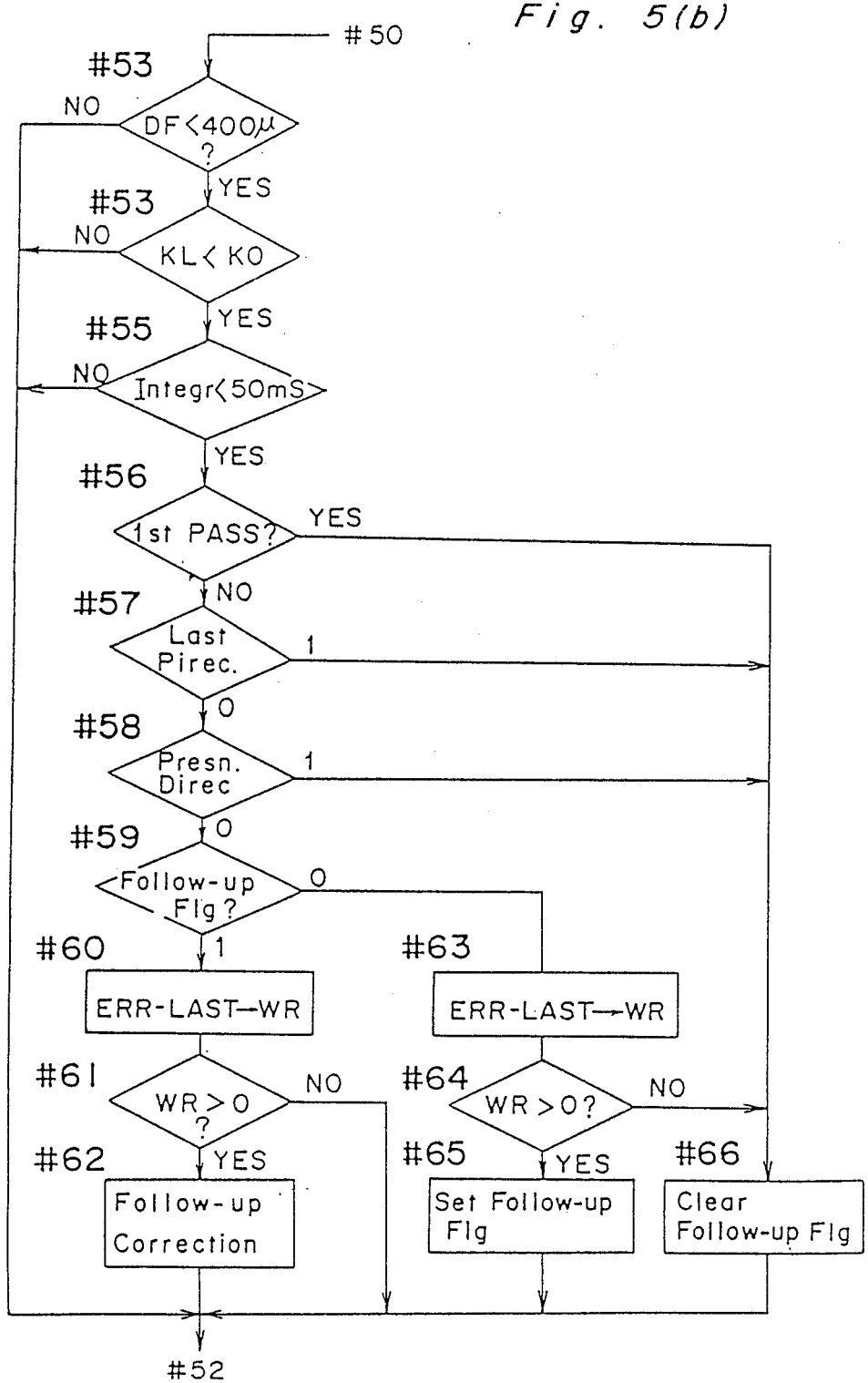

FIG. 5 is a flow chart showing proceedings to be executed during the stop of the lens and corresponding steps from #8 to #16.

In this embodiment, there is assumed such a situation that an object is moving toward a camera.

When it is decided at step #4 of FIG. 1 that a focus condition detection is possible, the process proceeds to step #44 of FIG. 5. At step #44, the defocus amount DF having been sought is multiplied by a transformation constant K ($K$ $TM$ $KL \cdot KB$) to obtain a product ERR which is the amount of drive of the motor (MOI) counted as a number of pulses N from the encoder (ENC).

At step #45, it is decided whether the lens is stopped or not. If not stopped, the process proceeds to step #21. If stopped, the process proceeds to step #46. The driving amount (ERR) of the motor is compared with a predetermined constant FZC for identifying whether the lens is in the focus zone or not at step #46. If ERR<FZC. the process proceeds to step #47 to light a green LED provided for indicating that the in-focus state has been obtained. The process proceeds to step #1 of FIG. 1 after memorizing, at step #48, the ERR and the direction thereof sought at the present time as the last data "LAST" and "LAST DRCT", respectively, in order for a next focus condition detection.

If it is decided that the lens is not in the focus zone, the process proceeds to step #50 to decide whether the driving direction sought at this time is same to the last driving direction or not. If it is inverted, the process proceeds to step #51 to correct the driving amount ERR of the present time by the back-rush CNV of the lens driving mechanism. Then, the corrected driving amount ERR and the direction thereof are memorized at step #52 similarly to step #48. Thereafter, the process is proceed to step #17 of FIG. 1.

If the direction is not inverted, the process proceeds to step #53.

It is decided at steps from #53 to #55 whether a follow-up mode is to be executed or not and, at steps from #56 to #59, actual conditions for executing the follow-up mode, that is, whether an object is approaching to a camera or not and whether a delay in the automatic focusing is caused or not are determined.

(A) Desicion about a necessity for follow-up mode

The follow-up mode is defined as a mode for correcting a defocus amount (in-focus position) sought by a correlation calculation by a movement of an object as will be apparent from the following description. The necessity therefor is decided according to three conditions as follows:

(A)-1 Whether the defocus amount having been sought at the present time is near zero.

Concretely, it is decided at step #53 if the defocus amount DF is smaller than 400 $\mu$ms. This condition is provided for the reason that it is meaningless to correct a defocus amount if it doesn't fall within a zone centered at zero and having a given width.

(A)-2 Magnitude of a transformation coefficient KL for a lens driving amount The transformation coefficient KL is a coefficient for transforming a defocus amount into a lens driving amount as mentioned above. If the interchangeable lens mounted has a transformation coefficient equal to or larger than a predetermined standard value $K_o$ such as a wide angle lens, it is decided at step #54 that any follow up operation is not necessary since the lens will be moved to the focus position quickly.

On the contrary to the above, if the interchangeable lens has a transformation coefficient smaller than the standard value $K_o$ such as a telescopic lens, it is decided that the follow up mode is necessary since it takes a relatively long time to move the lens to the focus position.

This criterion is not limited to a transformation coefficient KL. In place of it, a focal length f of the individual interchangeable lens can be used as a criterion. In this case, it is decided for a follow-up mode to be necessary if the focal length f is longer than a predetermined length, for instance 100 mms.

(A)-3 Desicion about brightness of an object

This condition is introduced taking into consideration that a follow-up correction can be done effectively if an object has a high brightness, but, if an object has a low brightness, it becomes impossible to carry out an effective follow-up correction since an integration time of the CCD image sensor is needed too long to do it.

Concretely, this condition is checked at step #55 in which whether or not an integration time of the CCD image sensor is shorter than a predetermined time interval, for instance 50 m sec. However, the condition about the brightness of an object can be decided depending upon a gain AGC given to the gain variable amplifier 26 for amplification of the outputs of the CCD image sensor by the auto-gain controller. If the gain is equal to or larger than four- hold, it is decided that no follow-up correction should be done.

According to these three conditions (A)-1 to 3, it is decided whether the follow-up correction should be done or not. In this embodiment, when all three conditions are satisfied, the mode for follow-up correction is carried out.

However, the follow-up correction mode can be carried out when one or two of these conditions is or are satisfied.

Also, if the specifications of a camera and interchangeable lenses used therefor are limited so as to satisfy all of those three conditions, decisions done at steps from #53 to #55 may be omitted.

(B) Follow-up conditions

Follow-up conditions are conditions for executing the follow-up correction mode. Concretely, the condition is determined such that delays in follow-up operations are found twice serially or a delay in a follow-up operation is found under a condition that a follow-up flag has been set already.

At step #56, it is decided whether the present auto-focusing loop is first one or not. If it is decided as being the first time, the process proceeds to step #66 to clear the follow-up flag. This is done in consideration of a possibility that the follow-up flag might have been set during the last auto-focusing operation which had been carried out prior to the auto-focusing operation of the present time. Accordingly, the follow-up correction mode cannot be started from the first. At step #59, it is checked whether the last lens driving direction indicates a front-focus condition or a rear-focus condition. If it indicated a front-focus conditions, the process proceeds to step #66 and, if it indicates a rear-focus condition, the process proceeds to step #58. At step #58, the defocus direction at the present time is also checked and, if it indicated a rear-focus condition too, the process proceeds to step #59 in order to check the follow-up flag. Therefore, the follow-up flag is checked for the first time when rear-focus conditions detected twice in succession. In the first auto-focusing loop, the process proceeds from step #56 directly to step #66. In an auto-focusing loop for the second time or thereafter, the process proceeds from step #56 to #59. If the follow-up flag has not been set, the process proceeds to step #63. At step #63, the lens driving amount ERR sought in the present loop is subtracted by the last lens driving amount LAST and the difference (ERR-LAST) is stored as WR. If it is decided at step #64 that the present one is larger than the last one, namely WR>0, the process proceeds to step #65 in order to set the follow-up flag since this suggests that a delay in the auto-focusing operation is caused. Since there is caused no delay if the difference WR is equal to zero or negative, the process proceeds to step #66 in order to clear the follow-up flag.

In the next loop after the follow-up flag has been set, the process proceeds from step #59 to step #60. At step #60, a difference WR between ERR and LAST is calculated ($WR = ERR - LAST$) and is stored similarly to step #63. If WR is positive, a follow-up correction is made for the first time at step #62 since this indicates that delays in the auto-focusing operation were caused twice in succession. Namely, the follow-up correction mode is started.

If WR is equal to or smaller than zero, the process proceeds to step #52 without clearing the follow-up flag. Bu this it is intended to correct a delay in the follow-up operation quickly when WR becomes negative. At step #52, the lens driving amount ERR of the present time and the direction thereof are stored as "LAST" and "LAST DRCT", respectively and, then, the process proceeds to step #1 of FIG. 1.

<II-4> The Principle of follow-up correction

(A) Normal picture taking mode

Using FIGS. 6 and 7, the following correction will be stated more precisely.

FIG. 6 is a time-chart showing repeated cycles each of which is comprised of an integration I by the CCD image sensor, a calculation C for detecting a defocus amount and a lens driving operation L. Each of times indicated by A,C,E,G,I and K is appointed as a representative time about an entry of data of an object image which is chosen as an intermediate point of each integration operation by the CCD image sensor. Each of times indicated by B,D,F,H,J and L is appointed as a timing at which calculation of each of lens driving amounts a,b,c,d,e and f has been ended.

Now, let us assume the case in that lens driving amounts a,b and c have a same direction and that these are increased in the order of a,b and c (namely, $a<b<c$).

At first, the first lens driving amount (a) is stored after the calculation thereof and, when the second driving amount (b) is sought, it is compared with the first one. If the first one is smaller than the second one, the follow-up flag is set and the second one is stored for comparison with the third one at the time that the latter is sought. If the third one(c) is larger than the second one (b),(b<c), the follow-up correction mode is started.

A delay caused during a time interval $t_1$ defined between timings D and F is sought from a difference $(c-b)$. This time interval $t_1$ is equal to a time interval $t_0$ defined between timings of the second and third data entries provided that the integration time and calculation time are kept constant, respectively.

The lens driving amount c sought at the time F from data entered at the timing E involves a delay in the follow-up operation having been caused during a time interval $t_2$ between the timings E and F. If the third lens driving ($L_3$) is done with use of the third lens driving amount, the delay is further increased due to a time interval $t_3$ needed for driving the lens. This time interval $t_3$ becomes longer than the lens driving time interval $L_3$ needed therefor without any follow-up correction since it takes a certain time to correct the lens driving amount with a correction data.

When the shutter button is pushed down for a shutter release after driving the lens, a further delay due to a time lag $t_4$ accompanied with the shutter release is further superposed. In other words, the lens driving amount (c) should be corrected taking into consideration of a possible delay which might be caused during a sum of times $t_2, t_3$ and $t_4$ ($=t_2+t_3+t_4$). It will be difficult to correct such a delay as mentioned above exactly. However, some approximation conditions may be considered practically as follows;

(1) First Approximation condition

According to the first approximation condition, a defocus amount DF of an object image formed on a film surface is assumed to vary at a constant speed. However, it is to be noted that the real defocus amount DF is increased rapidly in a short distance range if the object is approaching at a constant speed.

(2) Second Approximation Condition

According to the second condition the sum of time intervals $t_2$ to $t_4$ during which a delay might be caused is approximated to the interval time $t_1$ being defined between the end timing D of the last calculation and the end timing F of the present calculation.

According to these approximation conditions, a lens driving having been corrected by the follow-up correction is set equal to $\{c+(c-b)\}=(2c-b)$. Therefore, the lens is driven in accordance with the corrected lens driving amount.

(B) Follow-up Correction during Continuous Picture taking Mode

FIG. 7 is a time chart showing a continuous picture taking mode. In this time chart, the integration operation I, the calculation operation C, the lens driving operation L and the shutter release operation R (which is defined as a time interval from a timing of an operation of the shutter release button to a timing at which the next integration operation can be started after the reflex mirror is stabilized at it's return position.

If same approximation conditions as mentioned about FIG. 6 were assumed, a delay about the lens driving amount would be equal to $(c-b)$. However, it is to be noted that the delay is caused during a time interval $t_0$ between timings C and E. In this case, however, a further delay is caused during the sum of a time interval $t_2$ between timings E (the center point of the integration interval $I_3$) and F (the end of the calculation interval $C_3$), a time interval $t_3$ (the lens drive interval $L_3$) and a release time lag $t_4$ and, therefore, the amount of this further delay should be added to the delay amount $(c-b)$.

However, it is to be noted that the time interval $t_0$ is longer than the sum $(t_2+t_3+t_4)$ in this case, as it clearly shown in FIG. 7. Namely, assuming or estimating the the integration time interval ($I_2/2$) is equal to ($I_3/2$) and nearly equal to (5 m secs.), the calculation time interval $c_2$ is equal to $c_3$ and nearly equal to 50 m sec, and that the lens driving time interval $L_2$ is nearly equal to $t_3$ (50 m sec.), the remainder of the time interval $t_0$, namely equal a sum of a shutter release time interval $R_2$ (estimated nearly equal to 200 m sec.) and the integration time interval ($I_3/2$), is apparently longer than the release time lag $t_4$ ($R_2/2$).

As is understood from the fact above mentioned, when the lens driving amount is corrected with the delay amount $(c-b)$, an overshoot in the follow-up correction may be caused. Accordingly, it is desirable to correct the lens driving amount with use of a product of $(c-b)$ with a constant smaller than 1.

III. Method for Follow-up Correction

Next a variety of methods for follow-up correction will be stated (See step #62 of FIG. 5).

<III-1> First Method

Figure 8:
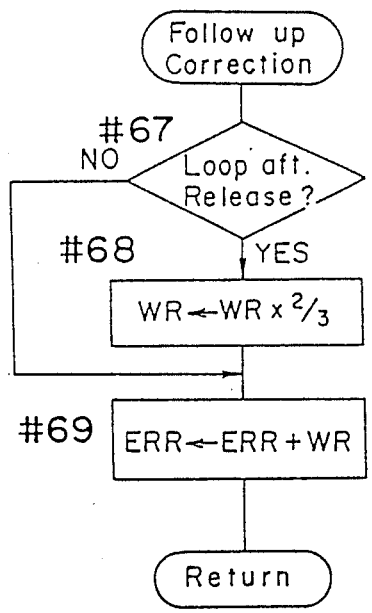
FIG. 8 is a flow-chart for showing a method of automatic focusing operation according to the present invention.
Figure 9:
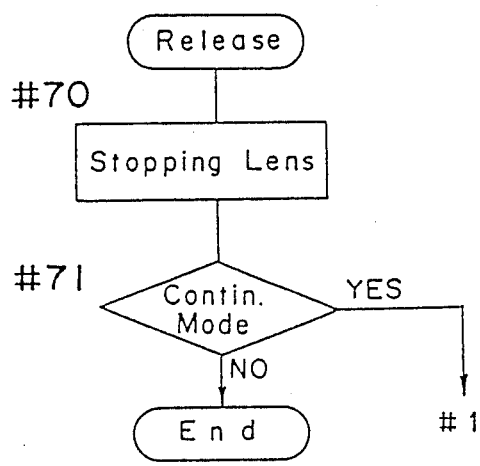
FIG. 9 is a flow chart for showing an interrupt routine to be executed when the shutter release button is operated.

As shown in FIG. 8, it is decided at step #67 upon executing a follow-up correction whether the process is looped after a shutter release, namely the mode is the continuous picture taking mode or not. This decision is done with use of a flag CRF (will be stated herein below).

When the shutter release button is pushed down during an execution of the main routine for the auto-focusing, an interrupt routine for shutter release is started and the lens is stopped at step #70 even when it is being driven. At step #71, it is decided whether the continuous picture taking mode is selected or not by a signal given by a continuous mode selecting means. If it is selected, the process is returned to step #1 of FIG. 1 in order to execute a next focus condition detection. If it is not selected, the process is finished.

If it is decided at step #71 that the continuous mode is selected, the flag CRF is set thereat into order for the decision at step #67. This flag CRF should be cleared immediately after the auto-focusing start switch is turned ON.

Returning to FIG. 8 again, if it is decided that the present mode is not the continuous mode, the process is skipped to step #69. At step #69, the lens driving amount ERR having been sought by a focus condition detecting calculation is corrected with a follow-up correction amount WR ($=c-b$) having been sought at step #60 of FIG. 5(ERR←ERR +WR).

On the contrary to the above, if the continuous mode is selected, the follow-up correction amount is multiflied by two thirds as mentioned regarding to FIG. 7 (WR←WR x ($\frac{2}{3}$)) and, then, the process proceeds to step #52 of FIG. 5.

Figure 10:
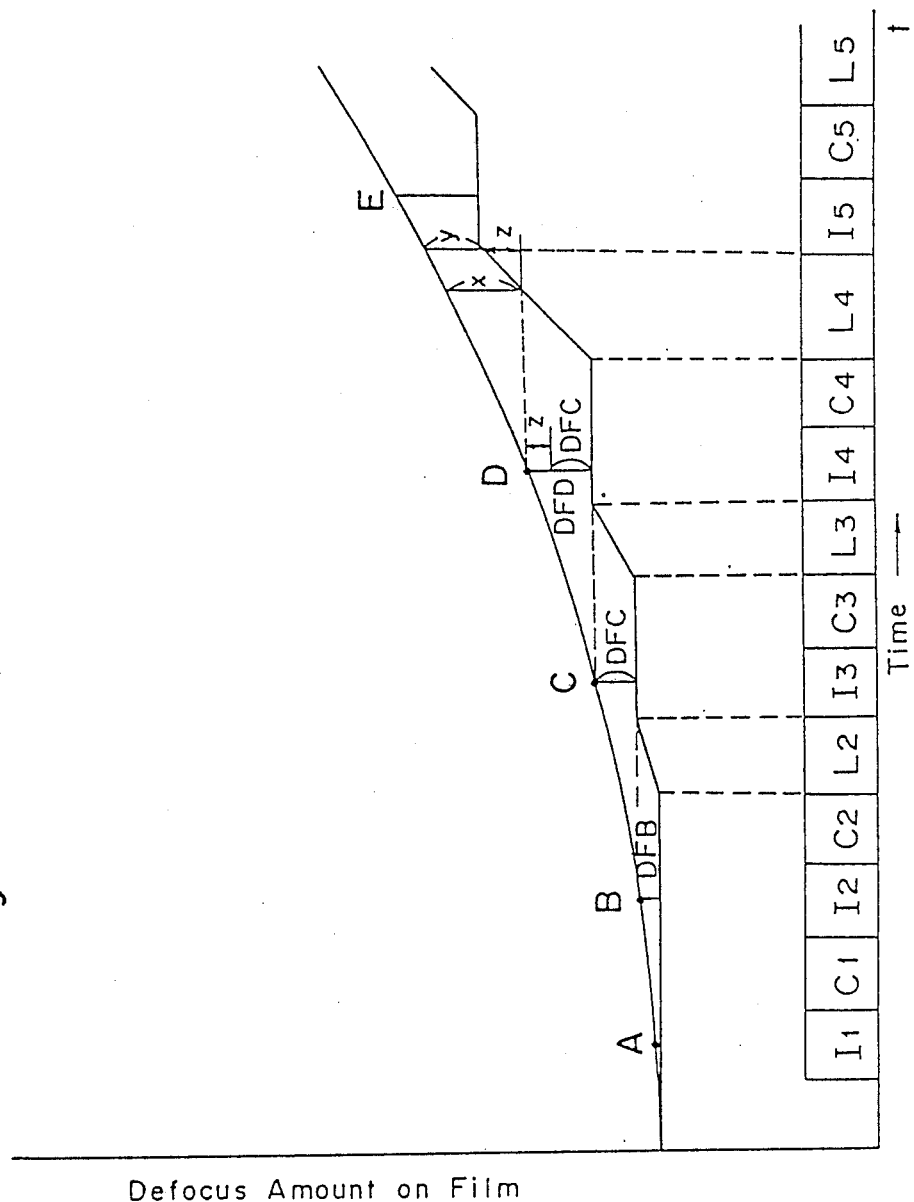
FIG. 10 is a graph for showing repeated automatic focusing operations according to the present invention.

FIG. 10 shows a manner how the follow-up correction is effected in a normal picture taking mode.

The horizontal axis FIG. 10 is a time axis and, along the time axis, the integration operation I, the calculation operation C and the lens driving operation L are repeatedly taken in the order of I, C and L. The vertical axis denotes a defocus amount defined on a film surface. At first, image data are read as represented by a timing A being the middle point of the first integration time $I_1$. Then a focus condition detection calculation $C_1$ is done with use of image data having been read.

If the lens is in the in-focus range at first, a next integration operation is started without driving the lens.

If a result DFB obtained from image data read at a timing B is out of focus, the lens is driven by the lens driving amount DFB. Then, if a result DFC obtained from image data read at a timing C indicates that the focusing lens is out of focus and the result DFC is larger than the last result DFB and further, if a result DFD obtained from image data read at a timing D is larger than DFC, a followup correction mode is started.

If the lens is driven only by DFD having been sought from image data read at the timing D during the lens driving time interval $L_4$, a defocus amount of x is caused since an object is moving.

However, according to the follow-up correction, a difference z ($z = DFD - FDC$) is added to DFD and the lens is driven by a corrected amount, namely (DFD+z) during the lens driving operation $L_4$. Accordingly, a resulting defocus amount is decreased to y which is equal to $(x-z)$.

<III-2> Second Method

Figure 11:
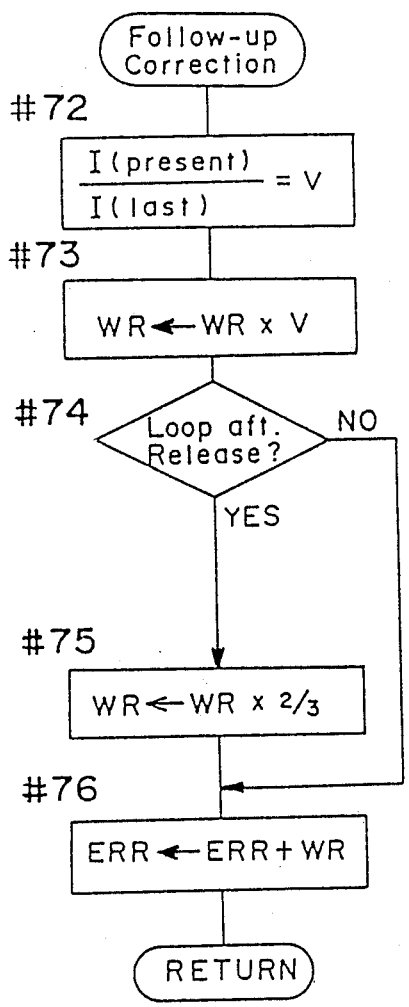
FIG. 11 is a flow chart showing another method of automatic focusing operation according to the present invention.

Another method shown in FIG. 11 is effective correct a lens driving amount even in the case that the brightness of an object is varied or an object is on a dark place.

From this view point, one of follow-up conditions about the brightness of an object which is defined at step #55 of FIG. 5 is omitted. If the condition that an integration time is equal to or shorter than 50 m sec. is not set, there may be a chance that a focus condition detection area aimed at by the CCD image sensor is changed to other area according to a distribution of the brightness of an object during an approaching movement of the object and due to such a change as mentioned above, the integration time might be varied.

According to this method, such a situation is considered.

At first, a ratio V of the present integration time interval $I_3$ to, the last integration time interval $I_2$ is calculated at step #72. At step #73, a delay amount WR (=c−b) is corrected with use of the ratio V as a correction coefficient (WR←WR×V). This correction is made taking into consideration that the time intervals $t_0$ and $t_1$ shown in FIG. 6 may become equal to each other due to this correction.

A strict solution of the ratio of the integration time interval may be given by the following equation when considered with use of FIG. 6.

$$V_0 = \frac{\{(I_3/2) + C_3 + t_3 + t_4\}}{\{(I_2/2) + (I_3/2) + C_2 + L_2\}}$$

Accordingly, it is desirable to use $V_0$ in place of V. This strict solution $V_o$ can be calculated by assuming that the time interval $t_3$ is nearly equal to $L_2$, $C_3$ is equal to $C_2$ and the time interval $t_4$ is set to a constant. Correction at steps #72 and #73 is an example wherein the strict solution is simplified.

At step #74, it is decided whether the present loop is successive to a shutter release or not, namely the mode is a continuous mode or not.

If not, the process proceeds to step #76 to obtain a new lens driving amount ERR by adding a correction amount WR to the lens driving amount ERR having been sought by the present focus condition detection. If the continuous mode is selected, the process proceeds to step #75 in order to correct a correction amount WR itself by a correction coefficient ($\frac{2}{3}$) and, then, further proceeds to step #76.

Although a constant ($\frac{2}{3}$) is used at step #75 as a correction coefficient, a strict solution $V_0$ given by the following equation can be used in place thereof.

$$U_o = \frac{\{(I_3/2) + C_3 + t_3 + t_4\}}{\{(I_2/2) + C_2 + L_2 + R_2 + (L_3/2)\}}$$

This strict solution $V_o$ can be calculated by assuming that $C_3$ is equal to $C_2$, $t_3$ is nearly equal to $L_2$ and that $t_4$ is set to a constant. In this case, the corrected lens driving amount is given by (WR×$\frac{2}{3}$).

In other words, the correction at step #75 is simplified without use of the strict solution $U_0$.

The correction coefficient is not limited to the value given at step #75 and is set to a suitable value depending upon an integration time, calculation time, lens driving speed and release time or the like.

III-3 Third Method

Figure 12:
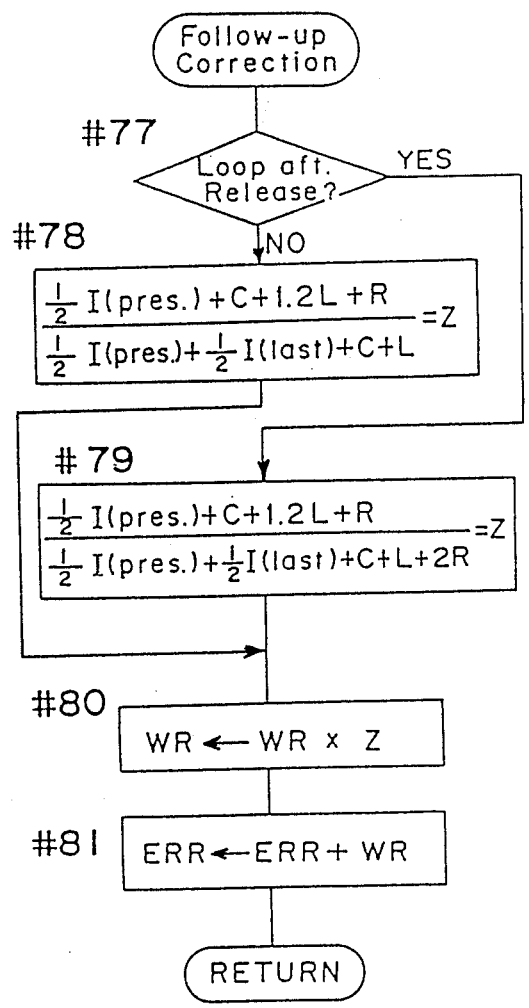
FIG. 12 is a flow chart showing one more method of automatic focusing operation according to the present invention.

According to the method shown in FIG. 12, correction coefficients for the follow-up correction are set respectively to the normal mode and continuous mode in view of the fact that a time delay in the auto-focusing which causes a defocus is different from each other in the normal mode and the continuous mode.

At first, it is decided at step #77 whether the present loop is a loop just after a shutter release or not. If it is just after a shutter release, the process proceeds to step #79 and, if not, proceeds to step #78. At step #78, a correction coefficient Z for the normal mode is calculated and, at step #79, that for the continuous mode is calculated, respectively. These coefficients are obtained from strict solutions $V_0$ and $U_0$ mentioned in Section III-2. These correction coefficients Z can be calculated in accordance with the equations given at steps #78 and #79, in which I (present) denotes the integration time of the present focus condition detection, I (last) denotes the integration time of the last focus condition detection, C denotes the time needed for calculating a defocus amount, L denotes the last lens driving time interval and R denotes a release time lag proper to the camera. The equation at step #78 is obtained from the strict solution $V_0$ by setting $C_3=C_2=C$, $t_4=R$, $L_2=L$, $t_3=1.2 L$, $I_3=I$ (present) and $I_2=I$ (last). L can be set to a lens driving time having been measured at the last auto-focusing process. The present lens driving time $t_3$ is estimated to an order of 1.2 times of the last lens driving time L. However, a coefficient other than 1.2 can be set according to another estimation. As is apparent from the comparison of the equation of step #79 to that of step #78, two times of the release time lag R is inserted into the denominator of the former equation. This is based on the estimation that a period of time needed from the operation of shutter button to start of an exposure by lifting up the reflex mirror and a period of time needed from the start of the exposure to the time when a vibration of the reflex mirror have damped sufficiently for ensuring start of a next focus condition detection after the mirror down are almost equal to each other. In other words, the whole release time interval $R_2$ is estimated equal to two times of the time interval $t_4 (=R)$ which is defined as the time interval from an operation of the shutter button to an exposure of a film. After the calculation of Z, a real follow-up correction amount WR is calculated with use of Z at step #80 (WR←WR×Z) and the lens driving amount ERR is corrected with WR at step #81. Then, the process is returns to the step #52.

IV Variations

In the preferred embodiment of the follow-up correction shown in FIG. 5, it is assumed that an object is moving toward or approaching to a camera. However, it is also possible to carry out a follow-up correction in the case that an object is going sway from the camera.

Figure 13:
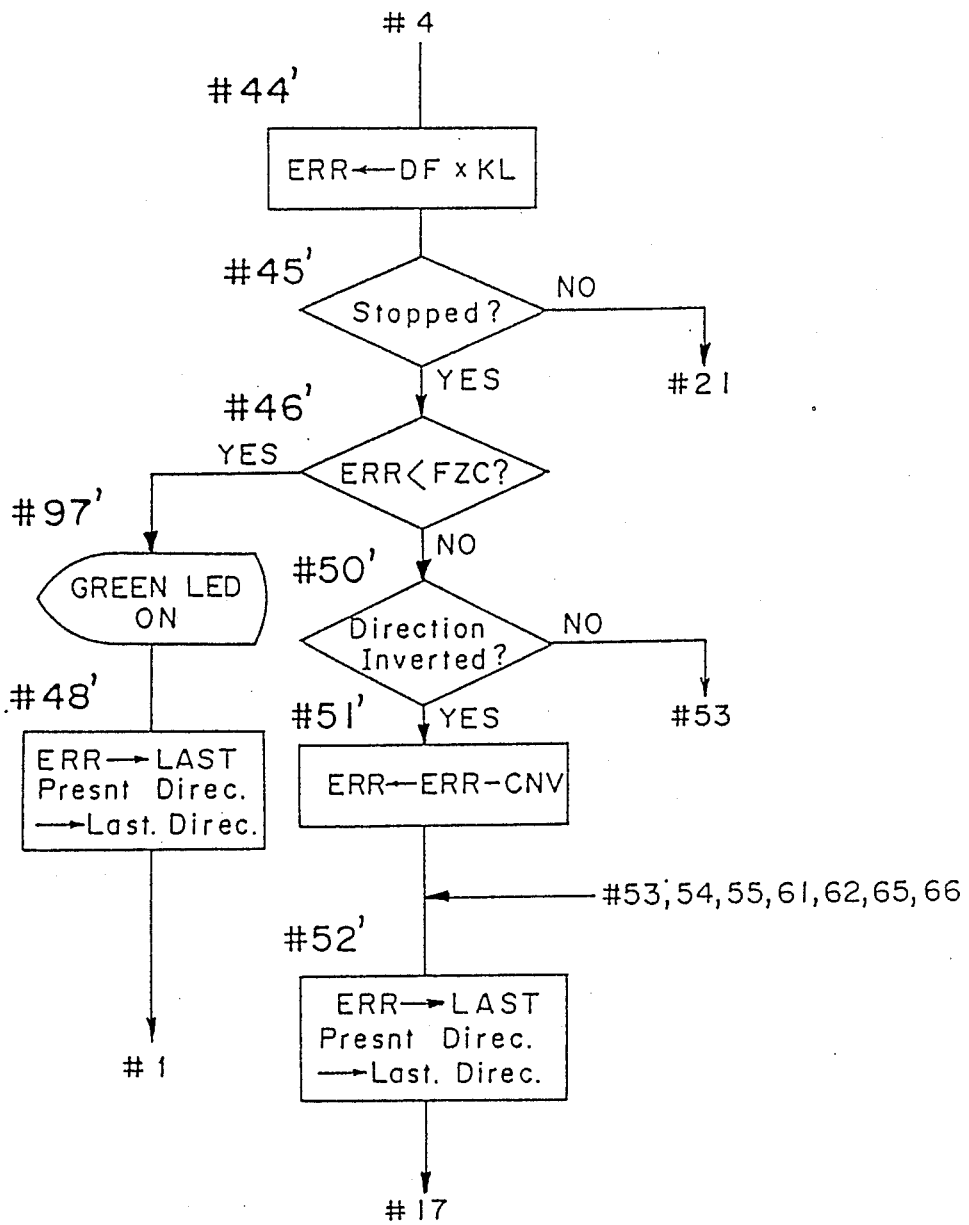
FIGS. 13(a) and 13(b) are a flow chart of a main routine to be executed when an object is going away from the camera.
Figure 13B:
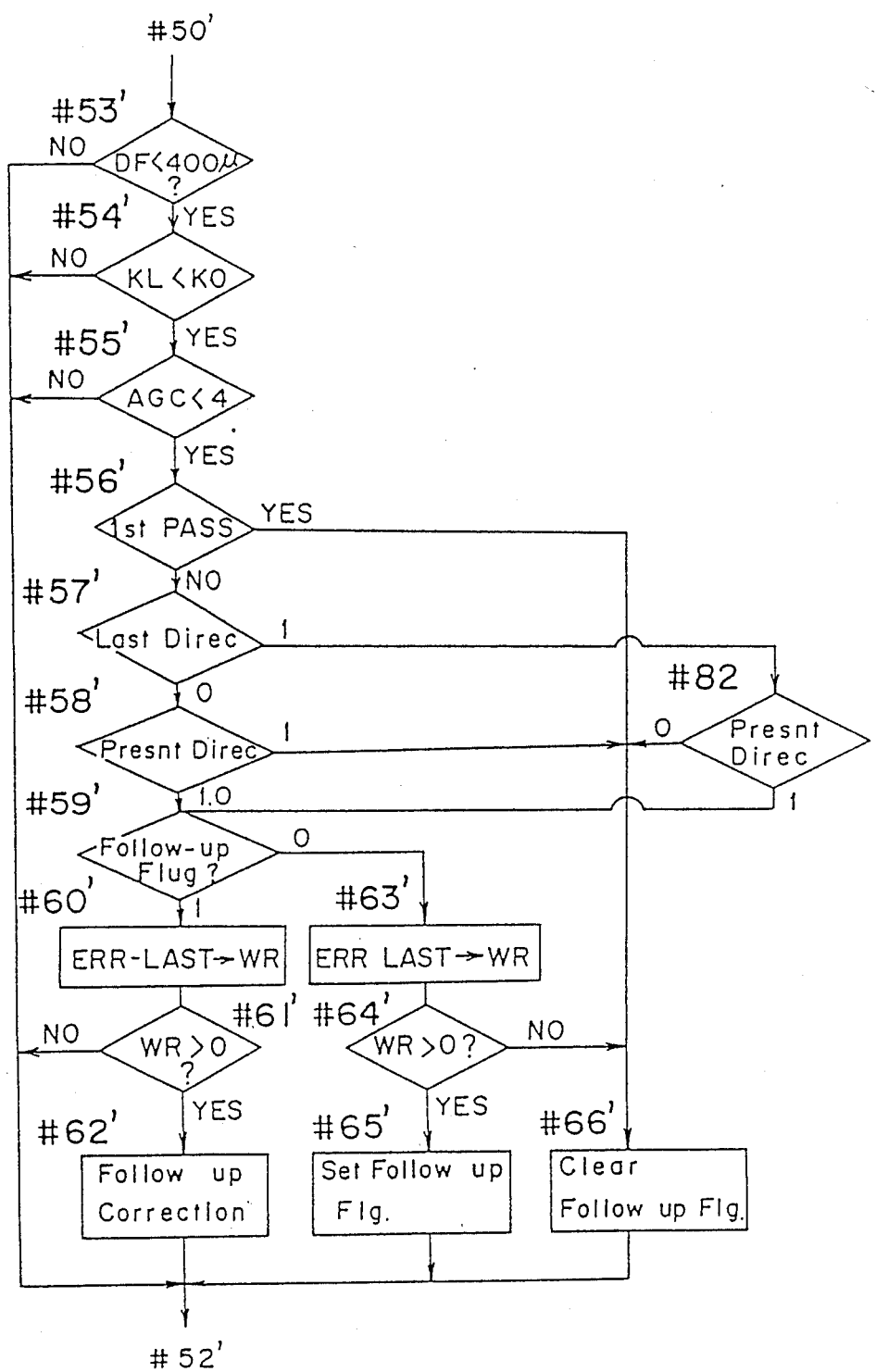

FIG. 13 shows a flow chart therefor. In FIG. 13, all of step numbers are attached with dashes as far as they correspond to steps shown in FIG. 5.

An important difference from the flow chart of FIG. 5 is step #82 provided for deciding whether an object is going away or not. If the last defocus direction is decided as being equal to "1" at step #57' (namely, frontfocus state), the process proceeds to step #82. If the present defocus direction is also equal to "1", the process proceeds to step #59' to check the follow-up flag. Namely, if two successive defocus directions are decided as being equal to "1", respectively, a follow-up correction for an object going away from the camera is started.

The follow-up correction is essentially same to the follow-up correction for an object approaching toward the camera except that a correction amount has a negative value as is easily understood from contents shown at steps from #59' to #66'.

Moreover, it is to be noted that the decision condition at step 55' is replaced to such an inequality as "AG-C<4". This condition is equivalent to the inequality given at step #55 of FIG. 5.

Further, according to the flow chart shown in FIG. 5, it is decided that a follow-up correction should be done when three successive defocus amounts have a same sign and, at the same time, two successive correction amounts WR are positive. However, these follow-up conditions will be simplified much more by omitting steps #59, #63, #64, #65 and #66 in FIG. 5. In this case, a follow-up correction will be started when two successive defocus amounts have a same sign and when the present defocus amount is larger than the last defocus amount.

While there has been described the preferred embodiments, modifications and variations being obvious to those skilled in the art are possible without departing from the spirit of the invention. The scope is therefore to be determined solely by the appended claims.

What is claimed is:

1. An automatic focusing device for a camera having a focus adjustable objective lens for forming an image of an object, comprising:
 focus detection means for repeatedly detecting the defocus amount of the image formed by an optical lens to generate a defocus signal corresponding to the detected defocus amount upon each detecting operation;
 object movement detection means for detecting movement of the object based on the defocus signals generated by the focus detection means to generate a movement signal corresponding to the amount of movement of the object;
 drive means for driving the objective lens for focus adjustment;
 correction means for generating a corrected defocus signal based on the movement signal regarding the object, and
 drive control means for causing the drive means to drive the objective lens in accordance with the corrected defocus signal, the corrected defocus signal corresponding to a defocus amount of the image from a predetermined focal plane at an initiation of an exposure operation of the camera.

2. An automatic focusing device as defined in claim 1, wherein the camera is designed to have a time lag from a camera release operation to the initiation of an exposure operation, and the correction means includes means for forecasting a possible change in the defocus amount of the image from the predetermined focal plane during the time lag and thereby generating the corrected defocus signal.

3. An automatic focusing device as defined in claim 2, wherein the forecasting means effects the forecast of the change in the defocus amount of the image from the predetermined focal plane and the generation of the corrected defocus signal based on the defocus signal and the movement signal generated through focus detecting operations by the focus detection means before a camera release operation.

4. An automatic focusing device for a camera having an objective lens for forming an image of an object, comprising:
 focus detection means for repeatedly detecting a defocus amount of the image formed by an optical lens to generate a defocus signal corresponding to the amount of the detected deviation upon each detecting operation;
 object movement detection means for detecting movement of the object based on the defocus signals generated by the focus detection means to generate a movement signal corresponding to the movement of the object;
 drive means for driving the objective lens for focus adjustment;
 correction signal generating means for generating a first corrected defocus signal based on the movement signal;
 means for changing the first corrected defocus signal according to a predetermined condition;
 means for generating a second corrected defocus signal based on the first corrected defocus signal having changed according to the predetermined condition, and
 drive control means for causing the drive means to drive the objective lens in accordance with the first corrected defocus signal or the second corrected defocus signal.

5. An automatic focusing device as defined in claim 4, wherein the changing means changes the first corrected defocus signal in accordance with the ratio between the time intervals spent for the latest and the former detecting operations by the focus detecting means.

6. An automatic focusing device as defined in claim 4, wherein the changing means changes the first corrected defocus signal in a different manner according to whether an exposure operation has been needed or not.

7. An automatic focusing device for a camera having an objective lens for forming an image of an object, comprising:
focus detection means for repeatedly detecting a defocus amount of the image formed by an optical lens to generate a defocus signal corresponding to the amount of the detected deviation upon each detecting operation;
correction means for generating a corrected defocus value based on a defocus value which will be defocused during a release time lag from a camera release operation to an initiation of an exposure operation;
drive means for driving the objective lens for focus adjustment, and
drive control means for causing the drive means to drive the objective lens in accordance with the corrected defocus signal.

8. An automatic focusing device as defined in claim 7, further comprising object movement detection means for detecting movement of the object based on the defocus signals generated upon repeated detecting operation of the focus detection means to generate a movement signal when the direction of the defocus represented by the defocus signals remains unchanged and the amount of defocus represented by the defocus signal is increasing, and wherein the correction means generates a corrected defocus value based on the movement signal and a defocus value which will be defocused by movement of the object during the release time lag.

9. An automatic focusing device for a camera having a focus adjustable objective lens for forming an image of an object, comprising:
focus detection means for repeatedly detecting a defocus amount of the image formed by an optical lens to generate a defocus signal corresponding to the detected defocus amount upon each detecting operation;
object movement detection means for detecting movement of the object based on the defocus signal generated by the focus detection means to generate a movement signal corresponding to the amount of movement of the object;
drive means for driving the objective lens for focus adjustment;
correction means for generating a corrected defocus signal based on the movement signal regarding the object;
prediction means for predicting a focusing position of the objective lines to be driven, and
drive control means for causing the drive means to drive the objective lens in accordance with the corrected defocus signal, the corrected defocus signal corresponding to a defocus amount of the image from the predicted focusing position.

* * * * *